US009010016B2

(12) United States Patent
Cowin

(10) Patent No.: US 9,010,016 B2
(45) Date of Patent: *Apr. 21, 2015

(54) REVERSIBLY DISENGAGING SLIDABLE STRIKE INDICATOR, POSITIONING SYSTEM, AND METHOD OF USING SAME

(75) Inventor: Clifton J. Cowin, Woodinville, WA (US)

(73) Assignee: Dream Waters, Inc., Woodinville, WA (US)

( * ) Notice: Subject to any disclaimer, the term of this patent is extended or adjusted under 35 U.S.C. 154(b) by 1224 days.

This patent is subject to a terminal disclaimer.

(21) Appl. No.: 11/993,407

(22) PCT Filed: Jun. 26, 2006

(86) PCT No.: PCT/US2006/024873
§ 371 (c)(1),
(2), (4) Date: Mar. 10, 2008

(87) PCT Pub. No.: WO2007/002617
PCT Pub. Date: Jan. 4, 2007

(65) Prior Publication Data
US 2010/0293835 A1 Nov. 25, 2010

Related U.S. Application Data

(63) Continuation-in-part of application No. 11/165,660, filed on Jun. 24, 2005, now Pat. No. 7,610,715.

(60) Provisional application No. 60/815,926, filed on Jun. 24, 2006.

(51) Int. Cl.
A01K 93/00 (2006.01)
A01K 93/02 (2006.01)
(52) U.S. Cl.
CPC ..................................... A01K 93/02 (2013.01)

(58) Field of Classification Search
USPC ............ 43/44.87, 44.88, 44.91, 44.92, 44.95
See application file for complete search history.

(56) References Cited

U.S. PATENT DOCUMENTS 2,393,070 A   1/1946  Saloun
2,483,788 A  10/1949  Smith
(Continued)

FOREIGN PATENT DOCUMENTS

EP   0119074 A1   9/1984
EP   1933619      6/2006
(Continued)

OTHER PUBLICATIONS

U.S. Appl. No. 60/815,926, filed Jun. 24, 2006, Inventor: Cowin, Assignee: Dream Waters.

Primary Examiner — David Parsley
(74) Attorney, Agent, or Firm — Davis Wright Tremaine, LLP

(57) ABSTRACT

Particular aspects provide novel strike indicators and line-stop members that are attachable to fishing lines, and that are reversibly disengagable therefrom and thereafter slidably along the line. Particular embodiments comprise: a buoyant main body having an axial channel with corresponding end surface openings; a retention member seat in the main body surface; and at least one line retention member receivable and retainable by the seat, and operative with the seat to retain a line passing therebetween at two points. The retention member is displaceable from the seat by sufficient line tension, thereby disengaging the slidable strike indicator. Particular embodiments comprise at least one line-stop member attachable at a user-selectable line position, and operative to attach, or delimit a slidable range of a disengaged slidable strike indicator. Novel methods for fishing, with a slidable reversibly detachable indicator, at a depth greater than the length of a fishing rod are presented.

9 Claims, 15 Drawing Sheets

(56) References Cited

U.S. PATENT DOCUMENTS

| | | | |
|---|---|---|---|
| 2,529,179 A * | 11/1950 | Oberholtzer | 43/44.91 |
| 2,556,932 A * | 6/1951 | Morrissey | 43/44.91 |
| 3,019,546 A * | 2/1962 | Hansen | 43/44.91 |
| 3,056,229 A * | 10/1962 | Haney | 43/44.87 |
| 3,124,892 A | 3/1964 | O'Brien | |
| 3,672,087 A * | 6/1972 | Milburn, Jr. | 43/44.88 |
| 3,800,459 A | 4/1974 | Fleischaker | |
| 3,949,513 A * | 4/1976 | Dmytriw | 43/44.93 |
| 3,967,407 A * | 7/1976 | Halbasch | 43/44.9 |
| 4,235,037 A | 11/1980 | Sivertsen | |
| 4,359,836 A | 11/1982 | Yuji | |
| 4,418,492 A * | 12/1983 | Rayburn | 43/44.9 |
| 4,472,903 A * | 9/1984 | Hutson | 43/44.91 |
| 4,615,136 A * | 10/1986 | Bank | 43/44.91 |
| 4,644,681 A | 2/1987 | Hutson | |
| 4,696,125 A | 9/1987 | Rayburn | |
| 4,845,884 A | 7/1989 | Pacitti | |
| 4,977,700 A | 12/1990 | Perlman et al. | |
| 4,986,023 A | 1/1991 | Bucholz | |
| 5,031,351 A | 7/1991 | Rogel | |
| 5,161,324 A | 11/1992 | Dorsey | |
| 5,197,220 A * | 3/1993 | Gibbs et al. | 43/42.09 |
| 5,456,041 A | 10/1995 | Schoeberlein | |
| 6,073,386 A | 6/2000 | Firmin | |
| 7,162,830 B2 * | 1/2007 | Sims | 43/44.9 |
| 7,610,715 B2 * | 11/2009 | Cowin | 43/44.91 |
| 8,272,159 B2 * | 9/2012 | Cowin | 43/44.91 |
| 2006/0288632 A1 | 12/2006 | Cowin | |

FOREIGN PATENT DOCUMENTS

| | | |
|---|---|---|
| FR | 2729273 A1 | 7/1996 |
| WO | 2007002617 | 1/2007 |
| WO | 2007150076 | 12/2007 |

* cited by examiner

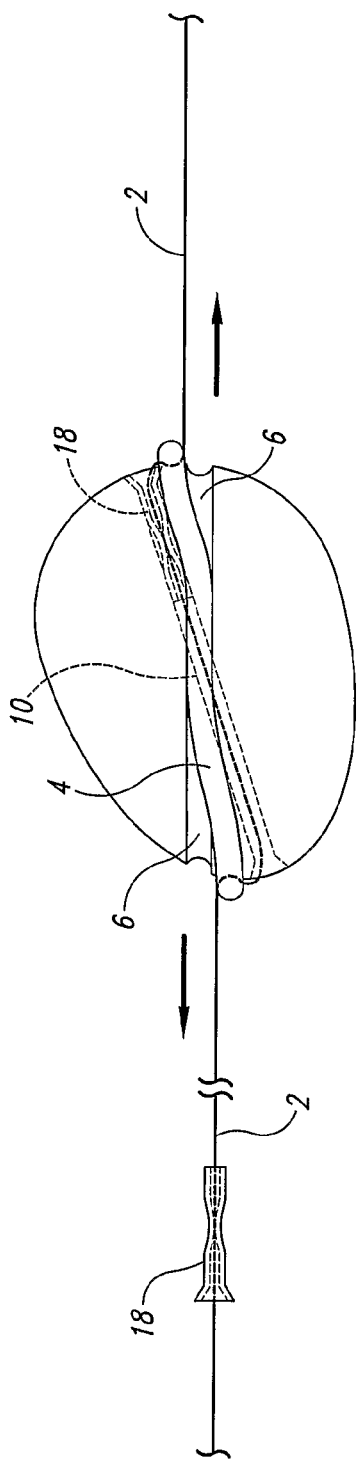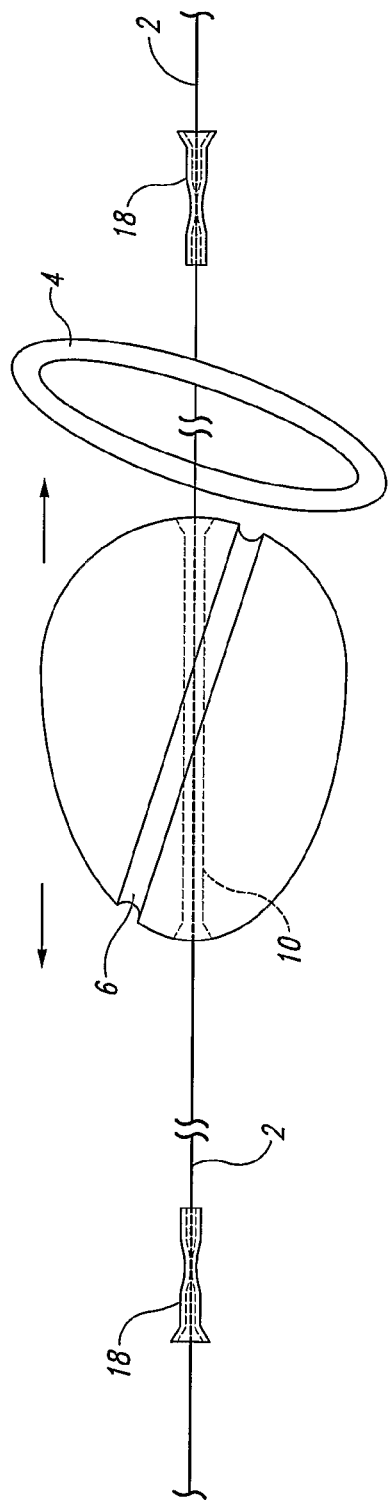
Fig. 5A
Fig. 5B

REVERSIBLY DISENGAGING SLIDABLE STRIKE INDICATOR, POSITIONING SYSTEM, AND METHOD OF USING SAME

CROSS-REFERENCE TO RELATED APPLICATIONS

The present application claims the benefit of priority to United States Utility patent application Ser. No. 11/165,660, filed 24 Jun. 2005 and entitled "REVERSIBLY DISENGAGING SLIDABLE STRIKE INDICATOR, POSITIONING SYSTEM, AND METHOD OF USING SAME," and to U.S. Provisional Patent Application Ser. No. 60/815,296, filed 24 Jun. 2006 and entitled "COMPOSITIONS AND METHODS FOR ENGAGING LINES," both of which are incorporated by reference herein in their entirety.

FIELD OF THE INVENTION

Aspects of the present invention relate generally to strike indicators for fishing lines and methods for using same, and more particularly to novel reversibly disengaging strike indicators that engage and disengage by novel means upon application of sufficient tension to the attendant line (e.g., strike-activated disengagement), and are thereafter slidable along the attendant fishing line between, in particular aspects, two settable positions (e.g., between hook-distal and hook proximal strike indicator stop member positions). Additional aspects relate to novel reversibly disengaging line-stop members that are reversibly attachable, and thereby adjustable to fix or demarcate a line position, or to demarcate a span (e.g., slidable adjustment span) along a line length. Further aspects relate to systems and methods comprising the preceding.

BACKGROUND

Strike indicators for fishing, including fly fishing and non-fly fishing, are known in the art. Typically, strike indicators are comprised of a buoyant material, and are large enough, and/or of suitable character (e.g., color, fluorescence, etc.), to be viewable at a operational distance by a fisherperson monitoring the indicator. Buoyant strike indicators, in operation, are designed to attachable to a fishing line, and thereby serve to suspend the line, with one or more attached fishing hooks or members at the end thereof, at a distance under the water corresponding to the length of line between the hook member and the strike indicator attachment point. When a fish strikes the suspended hook(s), the strike indicator is correspondingly displaced at the surface, thereby signaling the fisherperson to respond, typically by 'setting' the hook into the fish using appropriate rod/line action. Therefore, such strike indicators function as a strike indicator, and also may, in particular instances, serve as a fishing depth positioning means.

To be operationally viewable, strike indicators are typically larger than the line 'guides' of a fishing rod (particularly the guides of fly rods, which are relatively small) and are typically attached at a fixed position along the fishing line. Therefore, without fisherperson intervention and removal of the attached indicator, the attached line is only retrievable through the guides of a fishing rod to the point of attachment of the strike indicator. For some fishing situations, this line retrieval limitation may not present a problem, because the length of line from the strike indicator attachment point to the hook(s) is less than or roughly equal to the rod length, enabling sufficient retrieval of line so that a hooked fish can be maneuvered to a position close enough for effective capture by the fisherperson. However, the line retrieval problem caused by prior art strike indicators is severe in many situations, and particularly in low-profile constrained contexts (e.g., boat or float-tube fishing), involving fishing with a hook suspended on a line from a strike indicator at depths that significantly exceed that of the rod length. Specifically, where the fishing depth exceeds the rod length, the line is not retrievable beyond the strike indicator attachment point (the strike indicator cannot pass through the line guides), and the distance from the rod tip to a hooked fish may be much greater than the rod length, making capture of the fish difficult if not impossible in low-profile and/or constrained fishing contexts. This substantial limitation not only reduces the number of fish catchable within a given time period because of loss of fish, but often results in harm to hooked fish because of the non-optimal capture conditions (hooked fish too far from the rod tip). While strike indicators that can be repositioned are known in the art, such repositioning is typically done by the fisherperson, and, practically speaking, cannot be effectively done once a fish has been hooked and the fisherperson and the fish are operationally engaged in an excited state.

One known approach to providing a strike indicator that is more easily slidable is the adjustable Frog Hair™ EZ-ON indicator (Gamma Technologies, Pittsburgh, Pa.), designed to be manually adjustable by sliding along a length of 'tippet' material. This approach is based on inserting line 'tippet' consecutively through two elastic positioning retainers that are retained at and within opposite ends of the axial bore of a buoyant indicator body (see FIG. 9). The elastic retainers enable the indicator to be forcibly repositioned along the leader, while providing sufficient gripping pressure against the leader to maintain its position. This system, however, has substantial drawbacks, because, due to the nature of the elastic positioning retainers, they become worn and cannot be reused, and the indicator cannot be reinstalled after removal from the leader (at least without obtaining new retainers and threading tippet therethrough using a special wire-loop threading tool). Additionally, while being slidably adjustable, these indicators are not quick release, and such adjustment is by means of significant force applied by the fisherperson, and does not enable, for example, practical repositioning of the indicator during a fish 'hook-up' when fish and fisherperson are actively engaged. Moreover, the elastic positioning retainers cannot pass over knots (e.g., 'blood' knots) that are typically found in most leaders being used, and even if they could their gripping character would be degraded, thereby rendering the indicator effectively useless in a short time.

A known approach to providing a releasable and slidable strike indicator is a quick release indicator (Waters West, Port Angeles, Wash.) designed to release in response to a fish 'hook-up.' This approach is based on inserting line 'tippet' consecutively through the axial bores of an foam-based (Styrofoam™-based) indicator and a black plastic stopper, forming a tippet loop in the tippet at a position between the indicator and the stopper, tucking a portion of the tippet loop into a stopper-receiving slot of the indicator, and inserting the stopper into the stopper receiving slot, thereby wedging, by pressure, the tucked tippet portion between the wall of the receiving slot and the stopper to reversibly attach the indicator stopper combination to the line tippet (see FIGS. 8A and 8B). With a fish 'hook-up,' the tension in the line increases and frees the tucked loop, thereafter allowing the indicator and stopper to freely slide along the fishing line. However, there are substantial drawbacks to this solution, including the fact that it is difficult, if not impossible, upon repeated use, to consistently wedge the tippet loop with a reproducible amount of force to provide the right amount of tension for triggering release on 'hook-up.' This is because, even if one were able to insert the stopper with consistent force into the receiving slot of the indicator, the amount of the tippet loop thereby wedge varies from event to event, and even more problematic, the amount of force required to effectively wedge the loop is enough to cause the loop material to deteriorate (e.g., deform, gouge, etc.) the wall of the receiving slot, giving rise to inconsistent and progressively deteriorating performance of the indicator system. Additionally, there is no provision for re-attaching the indicator at a set line position from one 'hook-up' to another to allow for reproducibly fishing at a set depth, and there is no provision (except the hook and the lines guides of the rod) to limit the slidable range. Moreover, because of the necessity to wedge enough stopper and tippet loop surface areas against the receiving slot wall to provide sufficient resistance to preclude inadvertent release events, the stopper and receiving slot must be of a sufficient size, thereby defining a minimum size (e.g., no such indicators are marketed that are smaller than about ½ inches to about ⅜ inches in diameter). Furthermore, the high profile of the stopper and the asymmetric design of the indicator/stopper combination are less than desirable in terms of line-fouling characteristics.

Therefore, there is a pronounced need in the art for strike indicators that are more easily and consistently disengagable from an attendant line or leader, and that are substantially more reusable. There is a pronounced need in the art for strike indicators that are disengagable by means other than direct contact or mediation by a fisherperson. There is a pronounced need in the art for strike indicators that are more easily and consistently disengagable, and thereafter readily slidable along a fishing line. There is a pronounced need in the art for a strike indicator system that is slidable along a fishing line within a user-settable defined range along a fishing line and/or leader. There is a pronounced need in the art for a strike indicator system that enables more effective and reproducible fishing with a strike indicator at depths significantly greater than the rod length.

SUMMARY OF THE INVENTION

Particular aspects of the present invention provide novel strike indicators that are attachable to fishing lines (e.g., fly fishing lines and/or leaders), and are disengagable therefrom, by novel reversibly retaining means, upon application of sufficient tension to the line (e.g., strike-activated disengagement). In additional aspects, the strike indicators are reversibly disengagable, and thereby slidably adjustable and positionable along a fishing line, including repositionable within a range defined by user-selectable stop position members.

In particular aspects, the inventive disengagable strike indicators comprise: a buoyant main body portion having an exterior surface, first and second main body ends, and an axial channel therebetween, with corresponding first and second main body end surface openings, wherein the channel is sufficient to accommodate slidable passage of a fishing line therethrough. There is an exterior line retaining member seat (e.g., a groove within the main body having sides and a bottom, or a ridge protruding from the main body surface having sides and a top), said retaining member seat running around the exterior surface of the main body. In preferred embodiments, the groove or ridge encompasses the channel axis such that the first and second end surface openings are disposed on opposite sides of the groove or ridge. In alternate embodiments, the retaining member seat (e.g., groove or ridge), while running around the exterior surface of the main body, does not thereby encompass the channel axis, such that the first and second end surface openings are disposed on the same side of the groove or ridge instead of on opposite sides as in preferred embodiments. A resilient annular line retention member having a suitable shape and size so as to be reversibly receivable and retainable by the retaining member seat (e.g., receivable within the groove, or upon the ridge), is operative with the seat to retain a fishing line passing therebetween at two points. Upon application of sufficient line tension, the resilient member is displaced from the groove or ridge, thereby disengaging the strike indicator and thereafter allowing sliding of the strike indicator main body axial channel along the fishing line.

Additional aspects provide a novel strike indicator system for fishing lines (e.g., fly fishing lines and/or leaders), the system comprising: a disegagable fishing line strike indicator that is, in operation, disengagable from and thereafter slidable along a fishing line and/or leader; and at least one strike indicator stop member attachable to a fishing line or leader, and sufficient, in operation, to limit slidable travel of the disengaged strike indicator. In particular embodiments, the system comprises two attachable strike indicator stop members, suitable, in operation of the system, to delimit a slidable range of a disengaged slidable strike indicator along a fishing line and/or leader. In additional embodiments, the system further comprises a fishing line for attachment of the disengagable strike indicator and at least one strike indicator stop member.

Further aspects provide a method of fishing (for any type of water and fishing; eg., salt water, fresh water, rivers, lakes, trout, salmon, bass, bluefish, etc.) with a strike indicator system, comprising: a fishing line and/or leader; a buoyant disengagable fishing line strike indicator that is reversibly attachable to, disengagable from and thereafter slidable along a fishing line and/or leader; and at least one strike indicator stop member attachable to a user-selectable position along the fishing line, and sufficient, in operation, to limit slidable travel of the disengaged strike indicator along the fishing line. In particular embodiments, the method is practiced with a system that comprises first and second attachable strike indicator stop members attached at different user-selected positions along the fishing line and/or leader, and suitable, in operation of the system, to delimit a slidable range of the disengaged slidable strike indicator along the fishing line. In particular aspects, the inventive disengagable strike indicator is attached to the line in engagement with the first line stop member attached at a first fixed line position, and upon disengagement, the disengaged strike indicator is thereafter slidable along the fishing line between the first and second line stop members, enabling, for example, practical and effective fishing with a strike indicator at depths greater than the rod length.

Additional aspects provide novel line-stop member devices and methods for adjustably and reversibly engaging a line (including, but not limited to fishing lines, ropes, string, cable, wire, cords, etc.) at an engagement position and/or for demarcating one or more positions and/or spans along a line. The inventive line-stop members are reversibly disengagable (or reversibly engagable), and thereby slidably adjustable and positionable along a line, and two such line-stop members can be used to define a user-selectable range or span therebetween.

Further aspects provide novel disengagable strike indicator systems that comprise, in addition to a strike-disengagable or non-strike-disengagable strike indicator, at least one 'reversibly disengagable strike indicator line-stop member' (e.g., as described herein below) that is attachable at a user-selected fixed position along a fishing line, and is engagable with the inventive strike indicator main bodies to limit slidable travel of a disengaged strike indicator along the fishing line, or is additionally or alternatively fixedly engageable with an internal engagement collar of particular inventive strike indicator embodiments to provide for a non-strike-disengagable strike indicator (e.g., an effectively fixed strike indicator).

In preferred embodiments, particular 'dual-use' inventive strike indictor bodies (having an internal engagement collar) can be used for dual purposes as a strike-disengagable (using a line-retention member in the line-retention member seat of the strike indicator main body), or non-strike-disengagable (not using a line-retention member, and alternatively fixedly engaging the internal enagagement collar with the inventive reversibly enagagable line-stop member) strike indicator.

Further aspects provide novel methods for fishing, comprising fishing with an inventive strike-disengagable or non-strike-disengagable strike indicator with the inventive reversibly disengagable strike indicator line-stop member(s) (e.g., as described herein below), or the inventive strike indicator system.

BRIEF DESCRIPTION OF THE DRAWINGS

FIGS. 5A and 5B show, according to particular aspects, a side view of an exemplary disengagable strike indicator system embodiment having a line stop member engaged therein (FIG. 5A) to attach the indicator at a user-selected position, and further shows (FIG. 5B) how the annular line retention member is displaceable from the exterior groove of the main body upon application of sufficient line tension (indicated the pair of opposing arrows), which disengages the strike indicators and thereafter allows sliding of the indicator along the line (e.g., between a pair of stop members attached to the line at user-selected positions). Typically, in such embodiments, the resilient retention member is displaced on the side of the larger (or otherwise asymmetric) aspect of a (e.g., ovoid) main body in the rod-proximal direction.

FIGS. 18A and 18B show the combination before and after, respectively, engagement of the screw-collar clamping line-stop member with the internal engagement collar 24. FIG. 18C shows, according to further aspects, an exemplary tool for disengaging the screw-collar clamping line-stop member from the internal engagement collar 24. In this exemplary embodiment, the internal engagement collar 24 and the counterbores 22 are asymmetrically configured within the strike indicator main body.

FIGS. 19A and 1913 show the combination before and after, respectively, engagement of the screw-collar clamping line-stop member with the internal engagement collar 24. FIG. 19C shows, according to further aspects, an exemplary tool for disengaging the screw-collar clamping line-stop member from the internal engagement collar 24. In this exemplary embodiment, the internal engagement collar 24 and the counterbores 22 are asymmetrically configured within the strike indicator main body.

DETAILED DESCRIPTION OF THE INVENTION

Particular aspects of the present invention provide novel disengagable strike indicators that are attachable, by novel means, to a fishing line at a user-selected position, and, upon disengagement therefrom, are slidable along the fishing line.

Additional aspects provide novel disengagable strike indicator systems that comprise, in addition to a disengagable strike indicator, at least one strike indicator stop member that is attachable at a user-selected fixed position along a fishing line, and is also engagable with the inventive strike indicator main bodies to limit slidable travel of a disengaged strike indicator along the fishing line.

Further aspects provide novel methods for fishing, comprising fishing with an inventive disengagable strike indicator, or the inventive strike indicator system.

Yet further aspects provide novel methods for effective and efficient fishing with a strike indicator at a depth greater than the length of a fishing rod, comprising fishing with an inventive disengagable strike indicator, or strike indicator system. The methods facilitate efficient capture of a hooked fish, increase fishing efficiency and the overall fishing experience, and decrease attendant injury to captured fish.

The following discussion describes in detail particular aspects and embodiments of the invention and several variations thereof. This discussion should not be construed as limiting the invention to the particular embodiments or to those particular variations. Practitioners skilled in the art will recognize numerous other embodiments and variations, as well, that are encompassed within the scope of the claim subject matter.

Figure 10A:
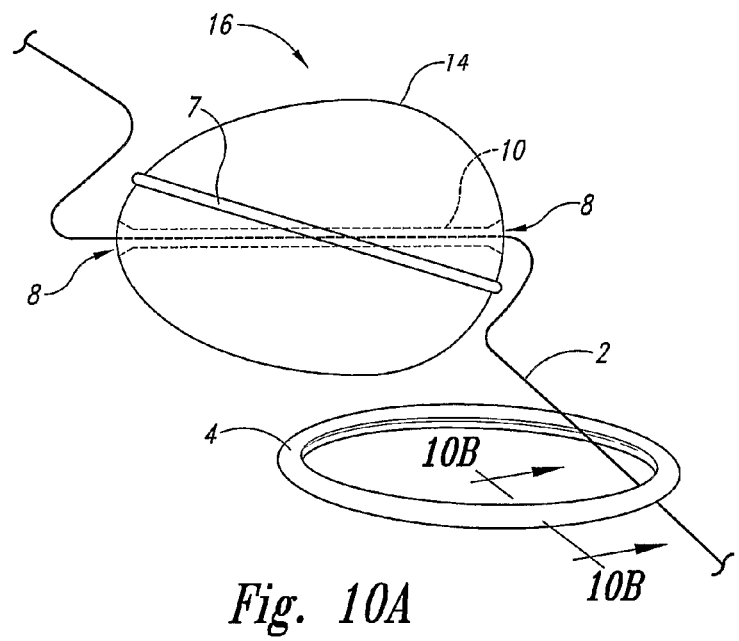
FIGS. 10A and 10B show, according to particular aspects, another exemplary embodiment similar to that of FIGS. 1 and 2, but having a line retaining member seat that is in the form of a rounded ridge protruding from the main body surface (FIG. 10A), instead of a groove within the main body. The line retaining member (FIG. 10B) has a groove on its inner surface that cooperatively conforms to the rounded ridge retaining member seat, and is operative with the ridge seat to retain a fishing line passing therebetween at two points.
Figure 11A:
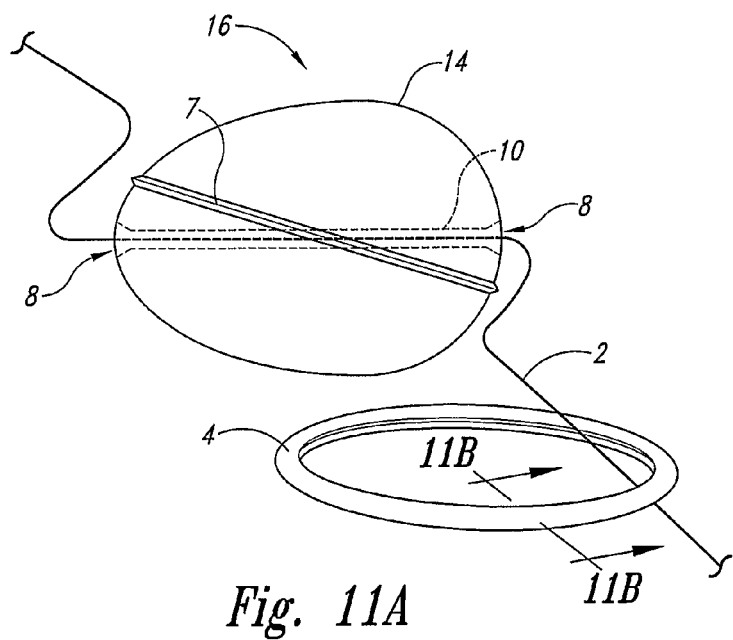
FIGS. 11A and 11B show, according to particular aspects, another exemplary embodiment similar to that of FIGS. 1 and 2, but having a line retaining member seat that is in the form of an inverted "V"-shaped ridge protruding from the main body surface (FIG. 11A), instead of a groove within the main body. The line retaining member (FIG. 11B) has a groove on its inner surface that cooperatively conforms to the "V"-shaped ridge retaining member seat, and is operative with the ridge seat to retain a fishing line passing therebetween at two points.
Figure 11B:
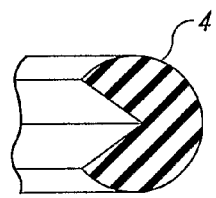
Figure 12A:
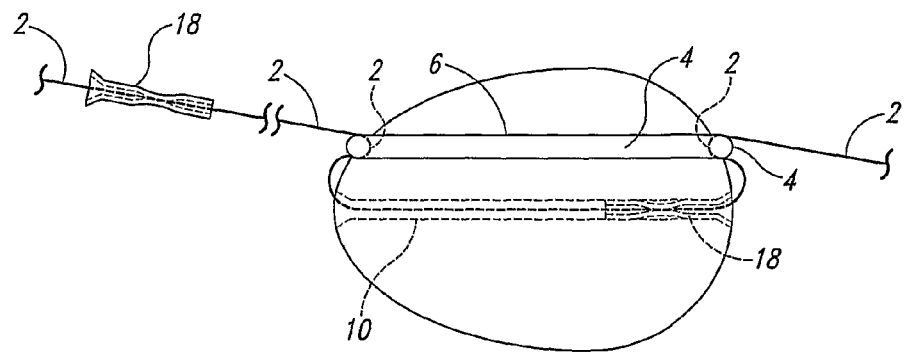
FIGS. 12A and 12B show, according to additional aspects, two alternate exemplary embodiments, which are similar to those shown in FIGS. 2 and 4, except the retaining member seat (e.g., groove or ridge), while running around the exterior surface of the main body, does not thereby encompass the channel axis, such that the first and second end surface openings are disposed on the same side of the retaining member seat (e.g., groove or ridge) instead of on opposite sides.
Figure 12B:
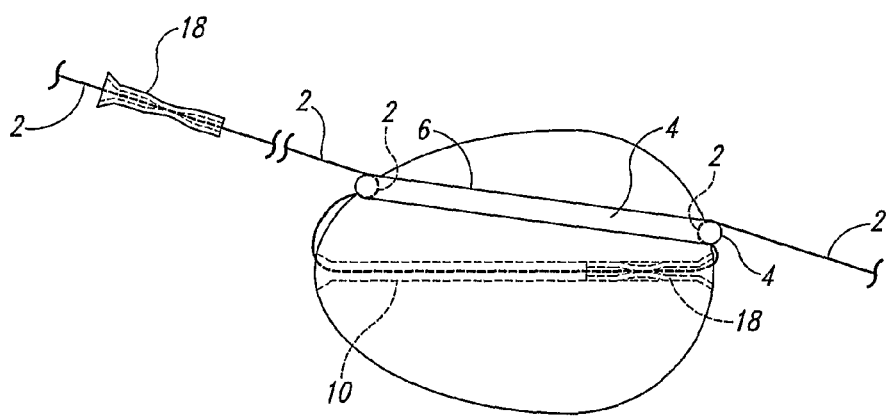

Disengagable Strike Indicator:

With reference to FIGS. 1, 2, 5A, 5B, 6A-6G, 10A, 10B, 11A, 11B, 12A and 12B, 13A-E, 14 and 15A and B, particular embodiments of the present invention are directed to a disengagable strike indicator 28 for a fishing line, comprising a buoyant main body portion 16 having an exterior surface 14, first and second main body ends, and an axial channel 10 therebetween, with corresponding first and second main body end surface openings 8, the channel 10 sufficient to accommodate slidable passage of a fishing line 2 therethrough. The main body 16 additionally comprises an exterior line retaining member seat (e.g., groove, channel, raised ridge, etc.), which in this embodiment is a groove 6, having sides and a bottom, within and around the exterior surface 14, wherein, in this embodiment, the groove 6 encompasses the channel 10 axis such that the first and second end surface openings 8 are disposed on opposite sides of the groove 6. In alternate exemplary embodiments (see FIGS. 10A and 11A), the line retaining member seat comprises an elevation or ridge 7 (e.g., rounded or inverted "V"-shaped) protruding, at least to some extent, from the main body surface 14. In particular less preferred alternate embodiments (see FIGS. 12A and 12B), the line retaining member seat (e.g., groove, ridge, etc.) is disposed around the exterior surface 14, but does not encompass the channel 10 axis, such that the first and second end surface openings 8 are disposed on the same side of the retaining member seat (e.g., groove 6). Embodiments as shown in FIGS. 12A and 12B are less preferred, because, inter alia (and absent additional retentions means), the retaining member 4 is not retained on the line after disengagement (see below). The exemplary disengagable strike indicator 28 of FIGS. 1 and 2 further comprises a resilient (e.g.: elastic; pliant; supple; flexible, etc.) line retention member 4 having a suitable shape (e.g., annular) and size so as to be reversibly receivable and retainable by the line retaining member seat (e.g., within the groove 6, or upon the ridge 7 (see FIGS. 10A, 10B, 11A and 11B), and operative with the seat to sufficiently retain a fishing line 2 passing therebetween at two points. In particular embodiments of the exemplary strike indicator 28 (see FIGS. 1 and 2), the main body channel 10 axis intersects a plane defined by the retention member seat (e.g., the exterior groove 6) at a right angle. In preferred embodiments, however, the main body channel 10 axis intersects a plane defined by the annular retention member seat (e.g., the exterior groove 6) at an acute angle (i.e., less than ninety degrees). Preferably, the angle between the main body channel 10 axis at one or the other main body end 8, and a plane defined by the retention member seat (e.g., the exterior groove 6) is selected from the range group consisting of: 180 degrees to 0 degrees, 90 degrees to 0 degrees, 45 degrees to 0 degrees less than about 90 degrees and greater than about 1 degree, less than about 90 degrees and greater than about 2 degrees, less than about 45 degrees and greater than about 1 degrees, less than about 30 degrees and greater than about 2 degrees; less than about 20 degrees and greater than about 5 degrees; less than about 15 degrees and greater than about 7 degrees, less than about 29 degrees and greater than about 25 degrees, about 28 degrees, and 28 degrees. Preferably, the angle between the main body channel 10 axis at one or the other main body end 8, and a plane defined by the retention member seat (e.g., groove 6) is less than about 15 degrees and greater than about 7 degrees. Preferably, the angle between the main body channel 10 axis at one or the other main body end 8, and a plane defined by the retention member seat (e.g., groove 6) is less than about 29 degrees and greater than about 27 degrees. In particular embodiments, the angles, in opposite directions, between the main body channel 10 axis at the respective opposite main body ends 8, and a plane defined by the retention member seat (e.g., groove 6) are the same or substantially the same. In alternate embodiments, the angles, in opposite directions, between the main body channel 10 axis at the respective opposite main body ends 8, and a plane defined by the retention member seat (e.g., groove 6) are different. In particular embodiments, the distance, in opposite directions, from the first and second main body end surface openings 8 to the retention member seat (e.g., groove 6) is the same or substantially the same. In alternate embodiments, the distances, in opposite directions, from the first and second main body end surface openings 8 to the retention member seat (e.g., groove 6) are different. Preferably, intersection of plane defined by the retention member seat (e.g., groove 6*c* channel, raised ridge, etc.) by the main body channel 10 axis is at a position corresponding to the center of the main body channel.

In alternate less preferred embodiments (see FIGS. 12A and 12B), the main body channel 10 axis does not intersect a plane defined by the retention member seat (e.g., the exterior groove 6 or ridge 7, etc.). In particular embodiments, the resilient annular line retention member 4 protrudes, at least to some extent, beyond exterior surface 14.

In embodiments where the resilient line retention member 4 is receivable into a groove 6 or channel, the retention member 4 is preferably receivable into the groove 6 to a distance not greater than about one-half the radial width of the resilient member 4, so that at least about half of the member 4 protrudes above the surface 14. However, according to aspects of the present invention, the extent of receipt of the retention member 4 into the groove 6 may vary, so long as the retention member 4 is sufficiently and reversibly retainable. In preferred embodiments, the depth of the retention member seat is in the range of about 0.025 cm to about 0.127 cm (e.g., 0.01 to about 0.05 inches), about 0.038 cm to about 0.10 cm (e.g., 0.015 to about 0.04 inches), about 0.05 cm to about 0.076 cm (e.g., 0.02 to about 0.03 inches). Preferably, the depth of the retention member seat is in the range of about 0.043 cm to about 0.086 cm (e.g., 0.017 to about 0.034 inches).

In particularly preferred embodiments (see FIGS. 13A-E and FIG. 14), the depth of the retention member seat (e.g., groove, channel, raised ridge, etc.) is greater at or near the main body ends than at or near the main body sides (central side areas). Preferably, in such embodiments, the depth of the retention member seat is greater at or near the main body ends and tapers to a lesser depth at or near the main body sides (i.e., central side areas; corresponding to a position at or near the center of the main body channel). In particularly preferred embodiments, the depth of the retention member seat at or near the main body ends tapers to a lesser depth at or near the main body sides (central side areas), with the depth at or near the main body ends being twice, or about twice, the seat depth at or near the main body sides (central side areas). For example, in particular embodiments, the seat depth at or near the main body ends is about 0.086 cm (e.g., about 0.034 inches), and tapers to a depth at or near the main body sides (central side areas) of about 0.043 cm (e.g., about 0.017 inches). Without being bound by theory, it is believed that upon application of sufficient line tension, the retention member is first disengaged from the retention member seat portions at or near the ends of the main body, and that further disengagement of the retention member from the main body side portions of the retention member seat is advantageously propagated or facilitated by such tapered-depth retention seats to provide for a more efficient full disengagement of the retention member. Such retention member seat depth tapering can, for example, be continuous tapering, discontinuous tapering, stepped tapering, combinations thereof, etc, with the advantage being afforded by a method of decreasing the effective retention member seat depth in going from the main body ends to the main body central portions. In embodiments with retention member seats that are raised ridges or the like, the height of the retention member seat (e.g., ridge), the advantage can be afforded by decreasing the effective retention member seat height in going from the main body ends to the main body central portions. Preferable, in such embodiments, the depth of the complementary retention member aspect (e.g., the depth of a complementary retention member groove that conforms to a raised ridge retention member seat) tapers in conformity with the tapered height of the retention member seat (e.g., ridge).

In particular embodiments, the depth (or height in, e.g., raised ridge embodiments) of the retention seat at or near the main body ends is about one-half the thickness or diameter of the material comprising the retention member, and tapers to a depth (or height in, e.g., raised ridge embodiments) at or near the main body sides (central side areas) of about one-quarter the thickness or diameter of the material comprising the retention member.

Figure 10B:
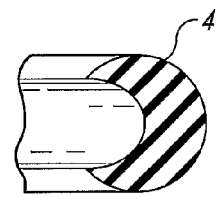

In embodiments where the resilient line retention member 4 is receivable onto a ridge 7 (e.g., FIGS. 10A, 10B, 11A and 11B), the retention member 4 is preferably receivable onto the ridge 7 to a distance not greater than about one-half the radial width of the resilient member 4, so that at least about half of the member 4 protrudes above the top of the ridge 7. However, according to aspects of the present invention, the extent of receipt of the retention member 4 onto the ridge 7 may vary, so long as the retention member is sufficiently and reversibly retainable upon the ridge 7. FIGS. 10B and 11B show blow-up cross-sectional views of exemplary retention member 4 sections to illustrate that. in these elevated seat or 'ridge' embodiments, the inner surfaces of the retention members provides a complementary aspect that conform to the respective exemplary retention member seats (e.g., rounded and inverted "V"-shaped ridges, respectively). In particular embodiments, the resilient line retention member 4 is elastic or stretchable, and of a size and dimension such that it is stretchably received and retained within the groove 6. In preferred embodiments, the line retention member 4 is annular (e.g., in the form of an o-ring) or equivalent rubber ring, or resilient ring of another elastic material (e.g., plastic, etc.). In particular embodiments, the retention member seat (e.g., groove 6 or ridge 7) is continuous around the exterior surface 14. In alternative embodiments, the retention member seat (e.g., exterior groove 6, or ridge 7) is formed of a plurality of discontinuous seat elements (e.g., repeated finite groove or ridge elements or sections) appropriately disposed around the exterior surface 14 to form a discontinuous seat pattern sufficient to receive and retain the resilient retention member 4. In preferred embodiments (e.g., FIGS. 1, 2, 4, 5A, 5B, 10A, 11A, 12A and 12B) the main body 16 is generally ovoid or ellipsoid, and the retention member seat is a generally elliptical or annular groove 6. However, according to alternate aspects of the present invention, the main body 16, may assume a variety of shapes (e.g., FIGS. 6A-6G) and dimensions. The inventive design allows for essentially any size of main body 16, and the retention member 4 and corresponding seat (e.g., 6 or 7) may assume a variety of sizes, widths, depths, etc., depending on the desired size, shape or design of the indicator main body 16. While essentially any main body size could be made, in preferred aspects for particular fishing situations, the main body 16 length or diameter is from about 0.6 cm to about 7.6 cm (e.g., ¼ to about 3 inches), from about 1.3 cm to about 5.1 cm (e.g., ½ to about 2 inches), from about 0.9 cm to about 3.75 cm (e.g., ⅞ to about 1.5 inches), or from about 2.8 cm to about 0.64 cm (e.g., ⅜ to about 1.25 inches), depending upon the type of application. In preferred aspects the main body length is about 2.7 cm (e.g., about 1 1/16 inches), 2.22 cm (e.g., about ⅞ inches), about 1.74 cm (e.g., about 11/16 inches) and 1.27 cm (e.g., about 0.5 inches), with respective main body widths of about 1.86 cm (e.g., about 0.734 inches), 1.55 cm (e.g., about 0.61 inches), about 1.25 cm (e.g., about 0.49 inches) and 0.99 cm (e.g., about 0.39 inches).

Preferably, and preferably for all embodiments, while the main body portion 16 is buoyant and may be of any suitable material and/or shape, the surface of the main body portion, and particularly that part of the surface adjacent to the retention member seat surface (e.g., at the retention member seat edge or shoulder), is preferably sufficiently rigid (e.g., sufficiently non-deformable or non-compressible) such that during strike-mediated disengagement, the 'moment arm' of leverage, provided by the orientation and position of the edge of the retention member seat with respect to the strike-tensioned line 2 in disengaging the retention member 4, is not lost, decreased or compromised because of compression or deformation of the edge of the retention member seat.

In particular aspects, corresponding retention members 4 are of a dimension to be receivable and retainable within or upon the conforming retention member seats (e.g., 6 or 7) of such preferred main body 16 size ranges (e.g., from about 0.6 cm to about 7.6 cm (e.g., from about ¼ to about 3 inches) in diameter, etc.). Retention member seat (e.g., 6 or 7) design and dimensions reflect the size and shape of the main body 16 and the retention members 4, and sufficiently conform to the retention members 4, so as to operationally reversibly receive and retain the retention members 4. Such seats (e.g., 6 or 7) can be grooves 6, channels or slots, etc., within the main body bodies 16, or can be elevated surfaces or ridges 7 protruding from the main body surface 14, and preferably conform in design and dimension to the main bodies 16 and the retention members 4. Preferred widths (e.g., cross-sectional) for retention members 4 are those that conform to that of the retention member seats. In preferred aspects, retention member cross-sectional widths range from about 0.08 cm to about 0.64 cm (e.g., about 1/32 to about ¼ inches), etc. In particular aspects the retention members consist, or are comprised of, elastic, stretchable, resilient material. The dimensions and/or compositions and/or elasticity parameters of such resilient retention members are selected to provide suitable line retention strengths for different types of fishing and fishing situations. Commercially available 'O-rings' are a preferred type of resilient annular retention member 4. However a variety of resilient materials could be used (e.g., rubber washers, elastic bands, rubber bands, etc.), or any material or any structure (resilient or not) that could be reversibly seated and unseated to reversibly retain a line 2 thereunder in operative association with the retention member seat. Preferably, the line-contact surface of the retention member is of a material that sufficiently grips the line (e.g., rubber, soft plastic, etc.) to preclude line slippage while the main body is engaged on a line. The retention members 4 may have a variety of cross-sectional widths and shapes (e.g., circular, ovoid, octagonal, square, rectangular, triangular, etc.), provided that they are reversibly receivable and retainable into or onto the retention member seat (e.g., 6 or 7). Preferable, the retaining member 4 sufficiently conforms in shape to the retention member seat (e.g., 6 or 7) to provide for adequate retention of the line in the retention member seat when the main body is engaged on a line.

In particular embodiments, the line retention member 4 is selected to have sufficient retentive force (offers sufficient resistance to being disengaged from the seat) when engaged within or upon the line retention member seat (e.g., 6 or 7), so as to effectively provide for a 'non-strike-disengageable' strike indicator (i.e., wherein the line is held sufficient tightly between the retention member and seat so that fish strikes and fish 'hook-ups' do not disengage the retention member 4 and indicator 28. Moreover, such 'fixed' line position embodiments are highly useful for particular types of fishing (where a strike-disengageable and/or slidable indicator is not needed), and are nonetheless novel and surprisingly effective by virtue of the instant inventive line-retention means, which nonetheless makes the indictors easily adjustable along a line, and reusable.

In additional aspects, the strike indicator 28, further comprises a fishing line 2 extending through the main body channel 10, the line being reversibly attached to the main body 16 at two points along the line 2 by means of the exterior retaining member seat (e.g., groove 6 or ridge 7) and the retention member 4, wherein the strike indicator 28 is disengagable from the line 2 upon application of sufficient tension to the line 2 (across the two attachment points) and is thereafter slidable (e.g., freely slidable) along the line 2. Therefore, in particular embodiments, the strike indicator 28, further comprises a fishing line extending through the main body channel 10, and, after emerging at the two opposing end openings 8, passing therefrom in, e.g., opposing directions between the retention member 4 and the retention member seat (e.g., passing between the retention member 4 and the external groove 6, or passing between the retention member 4 and the external ridge 7), wherein the strike indicator 28 is thereby reversibly attached at two points along the line 2. The strike indicator 28 is thereby disengagable from the line 2 upon application of sufficient tension to the line 2 (to disengage the retention member 4 from the retention member seat) and is thereafter slidable along the line 2 (see, e.g., FIGS. 5A and 5B).

Figure 1:
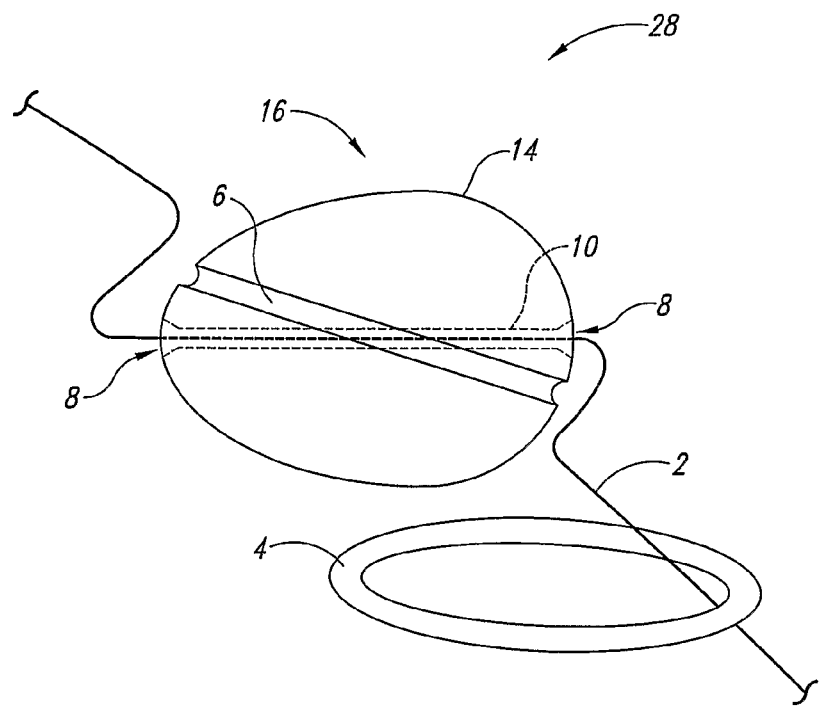
FIG. 1 shows, according to particular aspects of the present invention, a side view of an exemplary disengagable strike indicator embodiment having an axial channel from end to end, an exterior groove within and around the exterior surface that encompasses the channel axis such that channel end openings are disposed on opposite sides of the groove, along with a resilient annular line retention member operative to retain a fishing line passing thereunder at two points within the groove.
Figure 2:
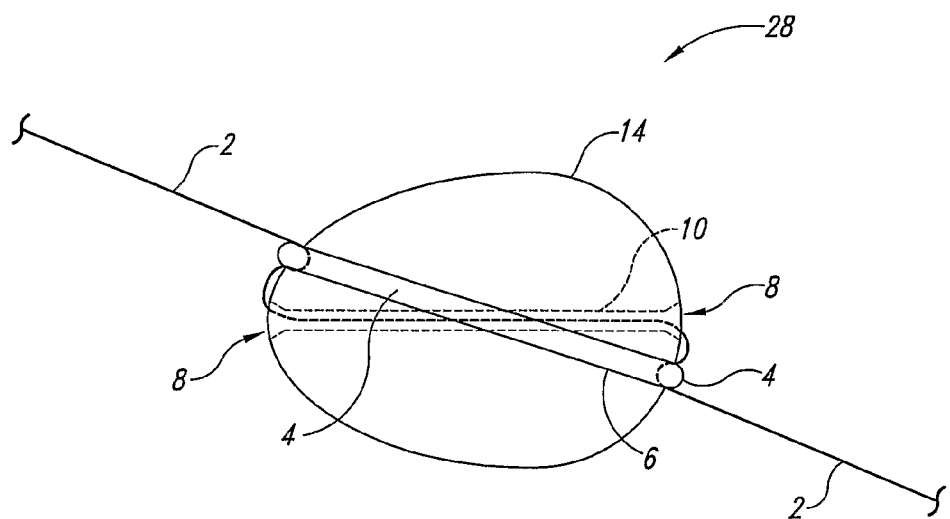
FIG. 2 shows the exemplary disengagable strike indicator embodiment of FIG. 1, wherein the resilient annular line retention member is seated in the exterior groove to retain a fishing line passing thereunder at two points within the groove.

FIG. 2 shows the exemplary disengagable strike indicator embodiment 28 of FIG. 1, wherein the resilient annular line retention member 4 is seated in the exterior groove 6 to retain an exemplary fishing line 2 passing therebetween at two points within the groove 6 (e.g., in this embodiment, positions near and offset from the respective channel end openings 8). In particular embodiments, the resilient retention member 4 is, upon application of sufficient line tension, preferentially displaced onto the line on the rod-proximal (e.g., larger), side of the main body 16 (e.g., on the side of the larger aspect of the ovoid main body 16 as in shown in FIGS. 1, 5B, 10A, 11A), which facilitates retention of the line retention member 4 on the rod-proximal (hook-distal) side of the strike indicator 28 after disengagement thereof from the line 2. Alternately, the resilient retention member 4 is displacable on the side of the smaller or opposite aspect of the main body 16. According to particular aspects, the shape of the indicator main body 16 and the disposition of the retention member seat (e.g., 6 or 7) thereto, can be selected to facilitate displacement of the line retention member to one side or another of the indicator main body upon disengagement (see e.g., FIGS. 1, 5B, 10A, 11A and 6B). In either case, the line retention member 4 is retained around the line 2, and thus operationally retrievable for reuse.

Figure 4:
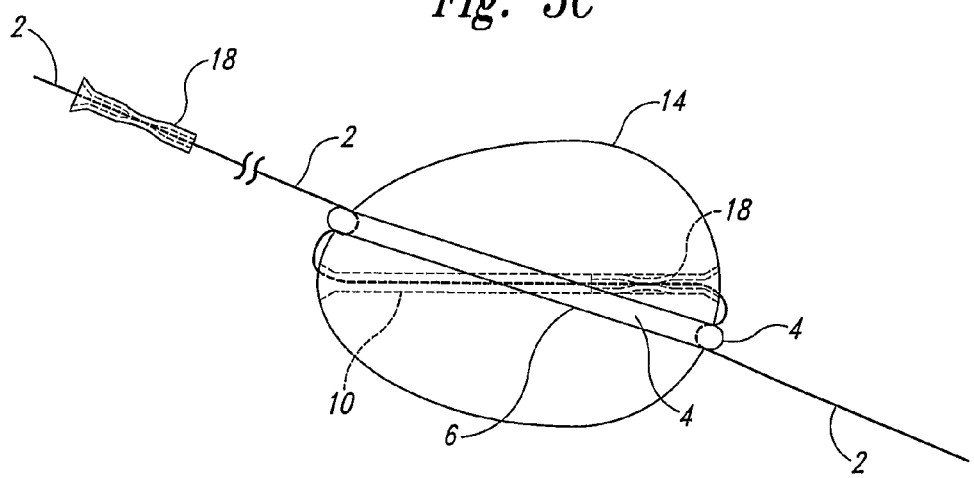
FIG. 4 shows, according to particular aspects, a side view of an exemplary disengagable strike indicator system embodiment having a line stop member engaged therein, and a line stop member located at a remote distance along the line, the two stop members defining a user-selectable range of slidable travel.
Figure 6A:
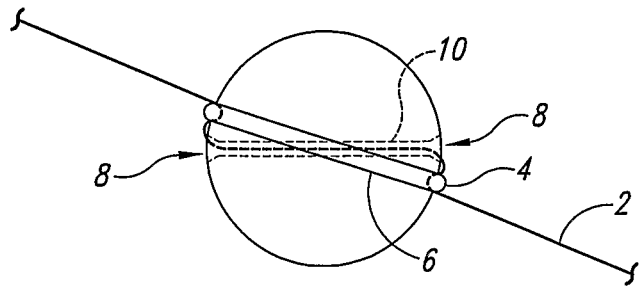
FIGS. 6A-6G show, according to particular aspects, side views of seven additional exemplary disengagable strike indicator embodiments to illustrate that the shape and size of the indicator main body, and the inventive system generally, can assume many different variations.
Figure 6B:
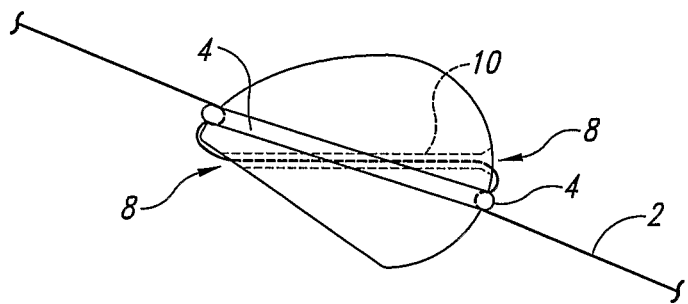
Figure 6C:
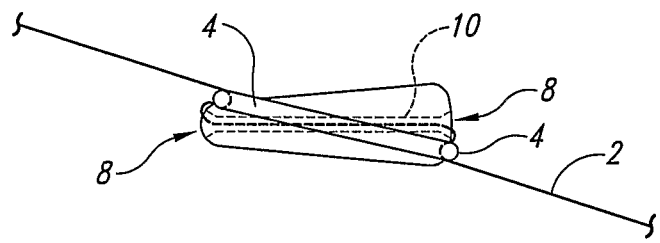
Figure 6D:
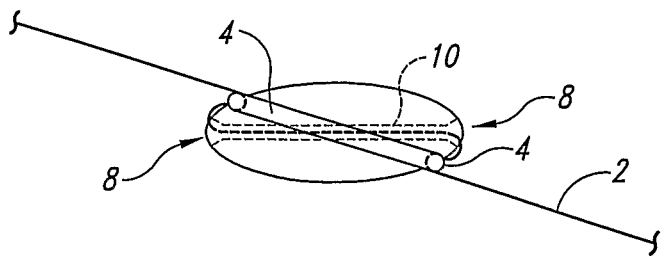
Figure 6E:
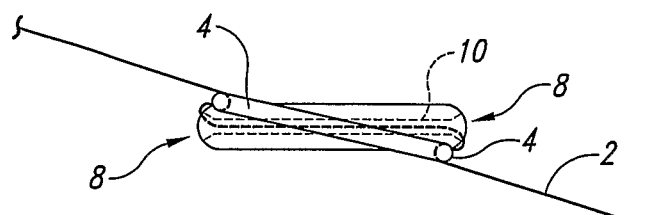
Figure 6F:
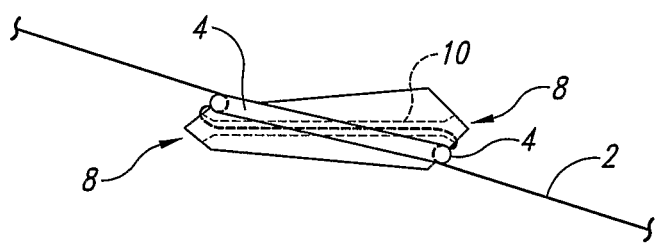
Figure 6G:
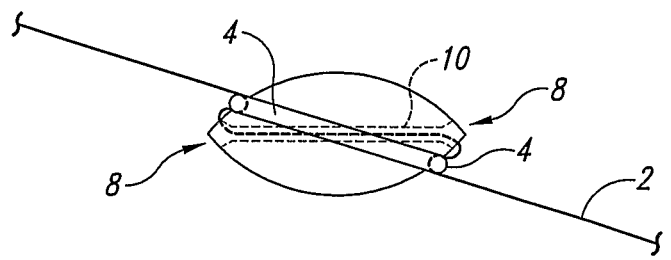
Figure 7:
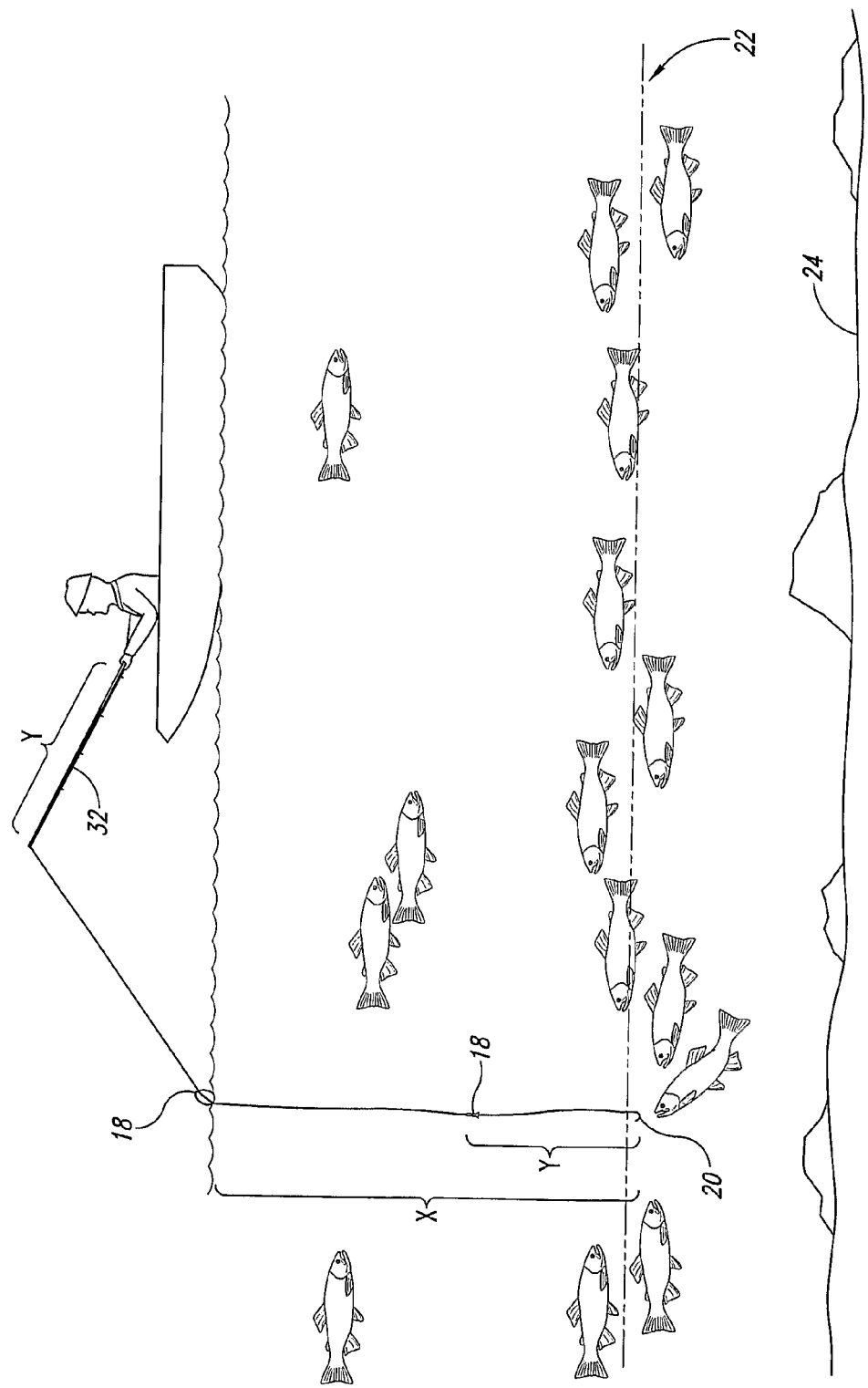
FIG. 7 shows, according to particular aspects, an illustration of an inventive method for fishing with a disengagable and slidable strike indicator at a depth (e.g., 'concentration feeding zone,' or 'holding zone' depth) greater than the length of a fishing rod. The method comprises use of an inventive disengagable strike indicator system, and not only facilitates effective fishing at a consistent user-selected depth, but also facilitates effective and efficient capture of a hooked fish, which in turn enhances the overall fishing experience, and reduces injury to captured fish.
Figure 8A:
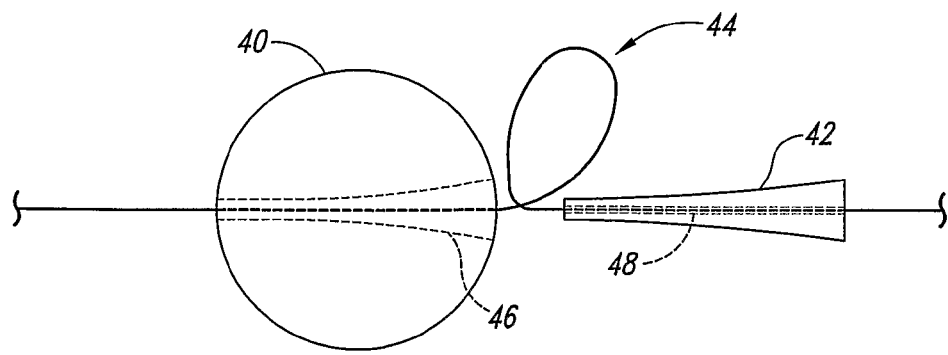
FIGS. 8A and 8B show a prior art quick release strike indicator. With a fish 'hook-up,' tension in the line frees a tippet loop that is wedged between a rubber stopper and the wall of a stopper receiving slot in the indicator body, thereafter allowing the indicator and stopper to freely slide along the fishing line. This indicator, and the substantial drawbacks thereof, are discussed herein above under "Background."
Figure 8B:
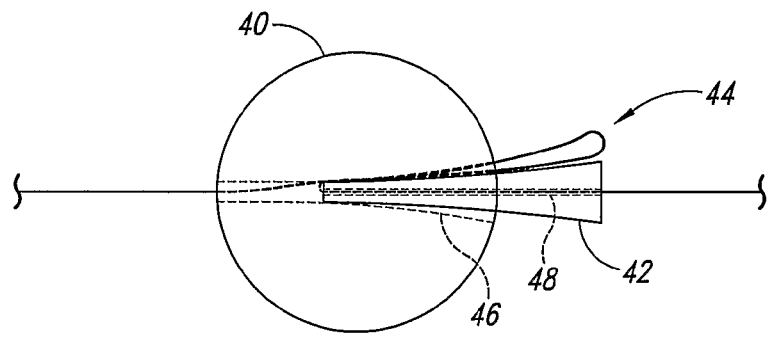
Figure 9:
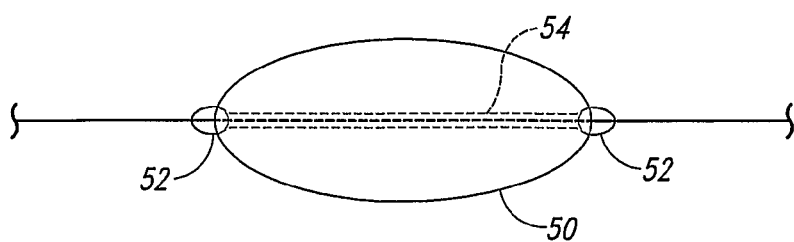
FIG. 9 shows a prior art slidable strike indicator. Elastic positioning retainers enable the indicator to be manually and forcibly repositioned along the leader, while providing sufficient gripping pressure against the leader to maintain its position. This indicator, and the substantial drawbacks thereof, are discussed herein above under "Background."

In other aspects, the retention member can be constructed, or torsionally-loaded so as to predispose disengagement to one side or another of the indicator main body upon disengagement. In preferred embodiments (e.g., in particular, with annular, elastic retention members), the design and/or manner of attaching the indicator main body portion to the line using the line retention member provides for disengaging (upon application of sufficient line tension) the retention member to the rod-proximal side of the indicator body. Preferably, and with reference to FIGS. 4, 5A and 5B for example, to insure that the retention member 4 disengages to the rod-proximal side of a line-mounted main body 14 (as shown in FIGS. 4, 5A and 5B), the retention member (e.g., O-ring) 4 is 'torsionally-loaded' by first engaging and retaining (e.g., by applying pressure using a finger or thumb) one portion of the retention member 4, and the line 2, to be stationary in the hook-proximal area/end of the line retention member seat 6 of the main body 14 (e.g., in the hook-proximal (left side of FIG. 4) end groove area of the retention member seat 6), and then 'rolling' the non-engaged diametrically opposed portion of the retention member 4 along the surface of the main body 14 (e.g., in a direction from left to right along the upper surface of the main body 14 of FIG. 4 for example) to engage and retain the rolled retention member 4 portion and line 2 into the hook-distal portion (right side of FIG. 4) of the line retention member seat 6 of the main body 14 to provide for a torsionally-loaded retained retention member 4 within the retention member seat 6, wherein the line retention member 4 is torsionally-loaded within the line retention member seat 6 by virtue of the retained rolling. The rolling or torsional loading is retained within the seat 6 because, in preferred aspects, the retention member 4 is elastic and sized in its unstretched (unstressed) and unrolled annular diameter to be sufficiently smaller than the corresponding retention member seat 6, such that the retention member 4 must be stressed (stretched) (with or without such rolling) to be retained within the retention member seat 6, resulting in a 'strained' (deformed) seated retention member 4 that is held seated within the retention member by virtue of the 'strain' (elastic, resiliant) forces. Preferably, in the case of asymmetric main bodies 14 (e.g., ovoid, etc) the smaller end of the indicator main body portion 14 is oriented in the hook-proximal orientation (left in FIGS. 4, 5A and 5B), so that the retention member 4 is first retained within the retention member seat 6 at the small main body end, and then rolled along the surface side of the main body 14 and retained in the retention member seat at the larger main body end (right in FIGS. 4, 5A and 5B), to provide for a torsionally-loaded retention member 4.

Without being bound by theory it is believed that in such preferred embodiments, initially retaining a portion of, for example, a circular retention member 4 (and the line 2) to be stationary within the hook-proximal area of the retention member seat 6, followed by rolling a diametrically opposed portion of the retention member 4 along the main body surface toward the hook-distal end of the main body portion 14, and engaging the rolled retention member 4 (and the line 2) therein, provides for a torsionally-loaded retention member 4, wherein the torsional forces (rolled windings) are asymmetrically distributed toward the rod-proximal portions of the retention member 4 and corresponding seat portions. This asymmetrical torsional distribution is believed to facilitate or predispose disengagement (upon application of sufficient line tension) of the retention member 4 to the rod-proximal side of the line-mounted main body portion 14 (as shown in FIG. 5B). Without being bound by theory, it is believed that the asymmetrical torsional distribution decreases the elasticity (or increases the stiffness or modulus of elasticity; e.g., increased Young's modulus) of the retention member 4 in the torsionally-loaded rod-proximal portion of the retention member 4 relative to the hook-proximal portion thereof. With reference to FIG. 5A, upon application of sufficient line-tension, therefore, the relatively elastic hook-proximal portion of the retention member 4 is disengaged from the retention member seat firs, or more easily, and is subsequently and vigorously drawn around the hook-proximal end of the main body 14 and toward the rod-proximal end of the main body 14 as the torsional loading of rod-proximal portion of the retention member 4 (which, during application of such sufficient force, remains engaged in the retention member seat 6 for a longer time relative to the hook-proximal portion thereof) is relieved.

Essentially, therefore, it is believed that such asymmetric torsional loading allows for initial disengagement (from the retention member seat) of the relatively elastic hook-proximal portion of the asymmetrically torsionally-loaded retention member 4 first, whereupon the retention member 'springs' to the rod-proximal side of the main body 14 in relief of the asymmetric torsional loading.

Alternatively, according to further aspects of the present invention, an asymmetric modulus of elasticity or torsional-loading distribution may be created in the construction (e.g., materials, methods) and/or design of the retention member per se (e.g., to obviate the need for 'rolling' or the like to asymmetrically increase the modulus of elasticity). However, rolled, torsionally-loaded embodiments are preferred, because they provide asymmetric torsional loading without the requirement for complex retention member design and/or materials, while nonetheless providing for an efficient, controlled strike-activated disengagement of the retention member from its seat.

Figure 13A:
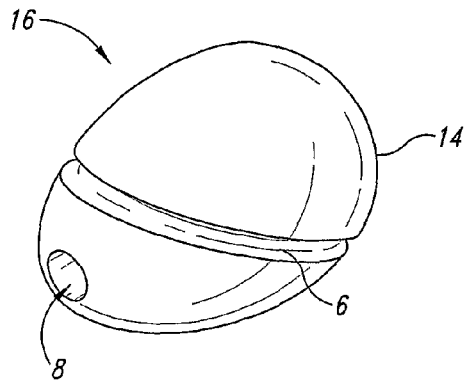
FIGS. 13A-E show a particularly preferred 'tapered-depth' retention member seat embodiment of a disengagable strike indicator 28 for a fishing line.
Figure 13B:
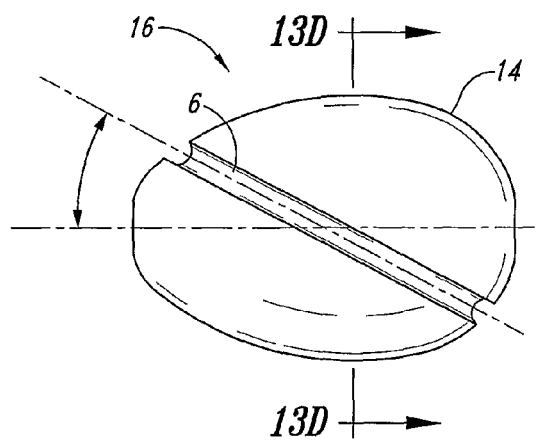
Figure 13C:
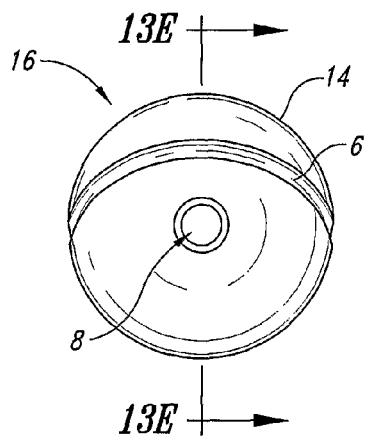
Figure 13D:
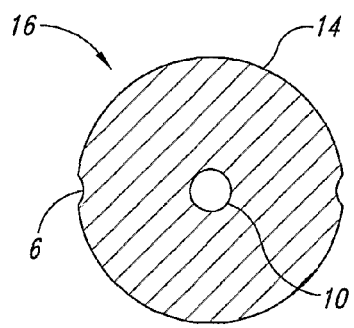
Figure 13E:
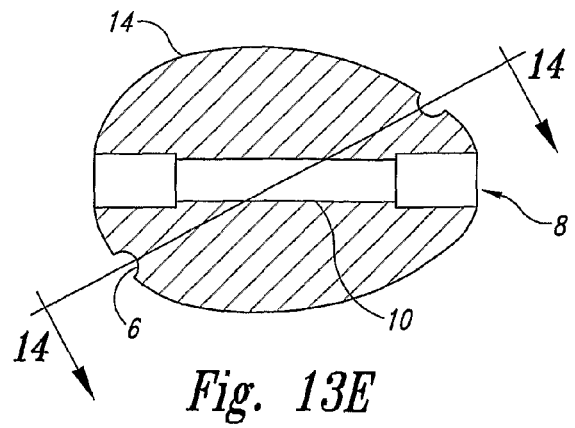
Figure 14:
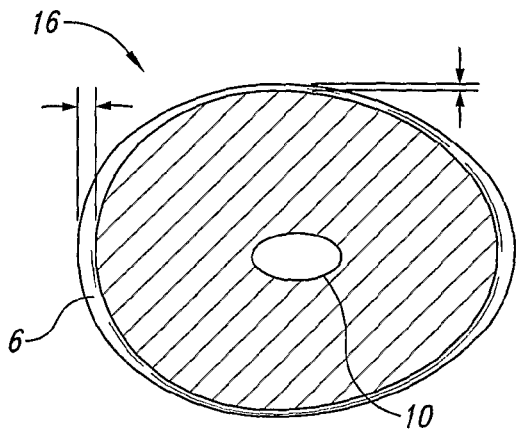
FIG. 14 shows another cross-sectional view of the particularly preferred 'tapered-depth' retention member seat embodiment of a disengagable strike indicator 28 for a fishing line shown in FIGS. 13A-E.

FIGS. 13A-E show a particularly preferred embodiment of a disengagable strike indicator 28 for a fishing line, comprising a buoyant ovoid main body portion 16 having an exterior surface 14, first and second main body ends, and an axial channel 10 therebetween, with corresponding first and second main body end surface openings 8, the channel 10 sufficient to accommodate slidable passage of a fishing line 2 (not shown) therethrough. The main body 16 (e.g., the surface thereof) additionally comprises a line retention member seat 6 (e.g., groove, channel, raised ridge, etc.), which in this embodiment is an annular groove 6, having sides and a bottom, within and around the exterior surface 14, wherein, in this embodiment, a plane defined by the groove 6 intersects the channel 10 axis such that the first and second end surface openings 8 are disposed on opposite sides of the groove 6 (or of the plane defined thereby). In this exemplary embodiment, the main body channel 10 axis intersects a plane defined by the annular retention member seat (e.g., the exterior groove 6) at an acute angle of about 28 degrees (FIG. 13D). Additionally, in this exemplary embodiment, the preferred point of intersection of the main body channel axis with the plane defined by the annular retention member seat is at a position corresponding to the center of the main body channel (FIG. 13D). FIG. 13B shows exemplary dimensional variables (see TABLE 1 below) for the main body length ("A"), width ("B"), axial channel inner bore diameter ("C"), axial channel outer bore (countersink) diameter ("D"), countersink depth ("E"), and retention seat radius ("R4"). FIG. 13D additionally shows exemplary radius values (radii) for main body surface portions ("R1," "R2" and R3"). Exemplary values for "A," "B," "C," "D," "E," "R1," "R2," "R3" and "R4" are provided in TABLE 1 below:

TABLE 1

Exemplary values, with respect to FIGS. 13A-E, for "A," "B," "C," "D," "E," "R1," "R2," "R3" and "R4"

| Exemplary Embodiment | A | B | C | D | E |
|---|---|---|---|---|---|
| 1 | 2.7 cm (1 1/16 inches) | 1.86 cm (0.734 inches) | 0.295 cm (0.116 inches) | 0.381 cm (0.15 inches) | 0.572 cm (0.225 inches) |
| 2 | 2.22 cm (7/8 inches) | 1.55 cm (0.61 inches) | 0.295 cm (0.116 inches) | 0.381 (0.15 inches) | 0.572 cm (0.225 inches) |
| 3 | 1.74 cm (11/16 inches) | 1.25 cm (0.49 inches) | 0.295 cm (0.116 inches) | 0.381 (0.15 inches) | 0.572 cm (0.225 inches) |
| 4 | 1.27 cm (0.5 inches) | 0.99 cm (0.39 inches) | 0.295 cm (0.116 inches) | 0.381 (0.15 inches) | 0.572 cm (0.225 inches) |

| Exemplary Embodiment | R1 | R2 | R3 | R4 |
|---|---|---|---|---|
| 1 | 0.60 cm (0.236 inches) | 2.21 cm (0.87 inches) | 0.91 cm (0.36 inches) | 0.203 cm (0.08 inches) |
| 2 | 0.51 cm (0.2 inches) | 1.83 cm (0.72 inches) | 0.762 cm (0.3 inches) | 0.203 cm (0.08 inches) |
| 3 | 0.41 cm (0.16 inches) | 1.47 cm (0.58 inches) | 0.61 cm (0.24 inches) | 0.203 cm (0.08 inches) |
| 4 | 0.33 cm (0.13 inches) | 1.17 cm (0.46 inches) | 0.48 cm (0.19 inches) | 0.203 cm (0.08 inches) |

Offset Axis Channel Embodiments

Figure 15A:
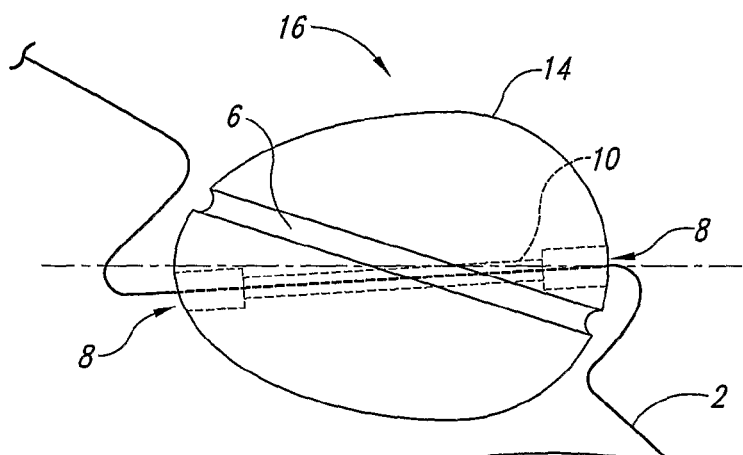
FIGS. 15A and 15B shows an alternate 'off-set' bore embodiment of a disengagable strike indicator 28 for a fishing line.
Figure 15B:
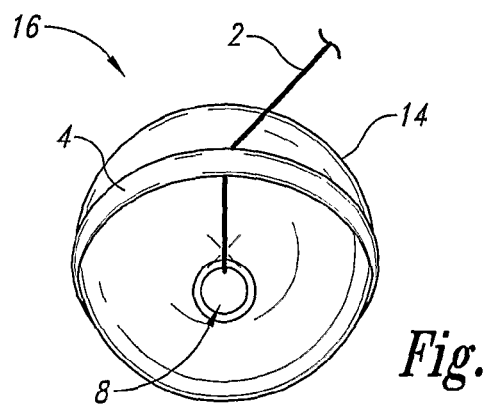
Figure 16A:
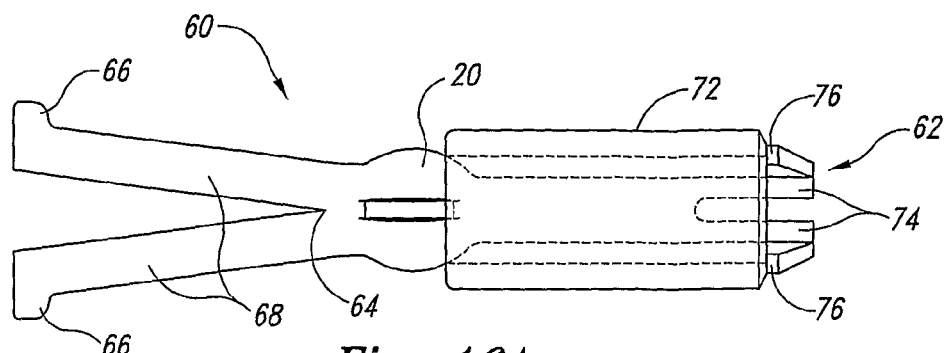
FIGS. 16A-E, show, according to an additional exemplary embodiment of the present invention, a snap-collar clamping line-stop member.
Figure 16B:
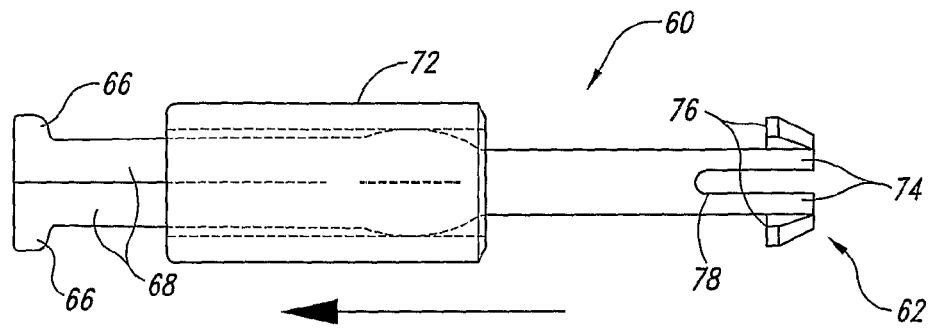
Figure 16C:
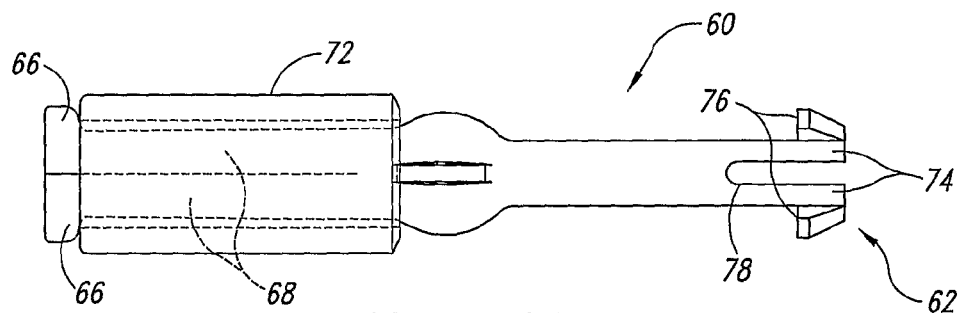
Figure 16D:
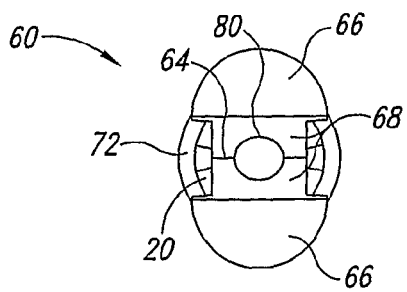
Figure 16E:
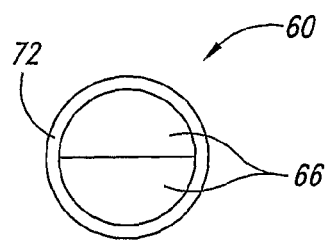
Figure 17A:
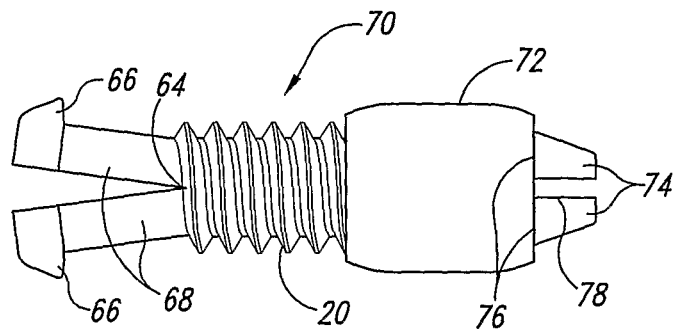
FIGS. 17A-D show, according to yet another exemplary embodiment of the present invention, a screw-collar clamping line-stop member.
Figure 17B:
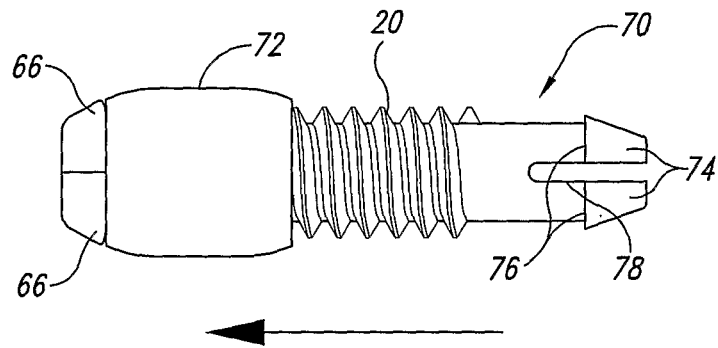
Figure 17C:
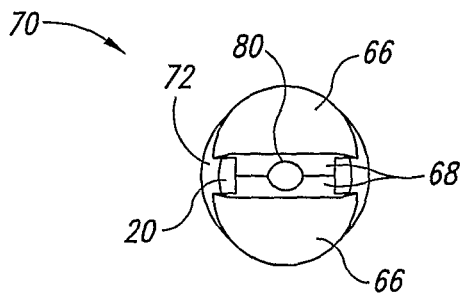
Figure 17D:
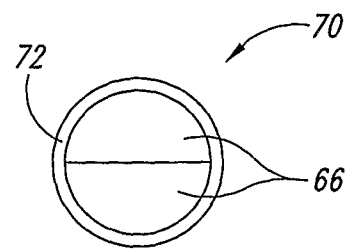

Preferably, the axis of the channel 10 of the main body portion 16 is coincident with the true central axis of the main body portion 16 (see, e.g., FIG. 1). Alternately, however, the axis of the channel 10 of the main body portion 16 is offset (e.g., at one or both channel ends) and/or is at a different angle with respect to the true central axis of the main body portion 16. For example, FIGS. 15A and 15B show an alternate, 'off-set' bore embodiment of a disengagable strike indicator 28 for a fishing line. In the embodiment of FIGS. 15A and B, the axis of the channel 10 of the main body portion 16 is offset from the true center axis at the small aspect end of the ovoid main body portion 16 and also is at a different angle with respect to the true central axis of the main body portion 16. In such embodiments where the actual channel bore is offset from theoretical true main body center axis (cross-hairs in FIG. 15B), e.g., in this embodiment, at the small end of the ovoid (but not at the big end), during strike-mediated disengagement of the line retention member 4, the strike-mediated line tension continues to be applied to the line retention member 4 at the small end, even after the point where the line retention member 4 has reached theoretical true center axis (cross-hairs). Without being bound by theory, this offset feature, and particularly when used in combination with the asymmetric torsional loading of the line retention member 4 as described elsewhere herein, facilitates consistent, reproducible strike-mediated disengagement of the line retention member 4 to the rod-proximal side of the main body portion 16.

Disengagable Strike Indicator System:

With reference to FIGS. 3, 4, 5A, 5B, 7, 12A and 12B, additional aspects provide a disengagable strike indicator system for a fishing line 2 and/or leader or tippet, comprising in addition to the elements and variations of the novel disengagable strike indicator described above, at least one line stop member 18 attachable (e.g., by crimping, adhering, elastic tension, etc.) at a user-selectable fixed position to a fishing line 2 and/or leader or tippet, the line stop member 18 having an outer surface, first and second stop member ends, and an axial stop member channel therebetween, with corresponding first and second stop member end surface openings, wherein the line stop member 18 is receivable into the axial channel 10 of the main body 16, and wherein an aspect of the shape and/or dimension (e.g., flange, or enlarged or extended aspect, etc.) of the line stop member 18 is operative to engage the line stop member 18 when received into the main body channel 10, and is thereby sufficient to preclude travel of a disengaged strike indicator beyond a user-selected fixed position where it engages the stop member 18. Such stop members 18 can be of any suitable material (e.g., metal, plastic, elastic material, etc.), and are dimensionally configured so as to be readily passable, upon line retrieval, through line guides of a fishing rod. Preferably, the outer surfaces of such stop members 18 are non-gripping to facilitate separation from the indicator main body channel 10 upon disengagement of the strike indicator 28 from the line 2, and to facilitate unfettered passage through the line guides upon line retrieval past the user-selected position of stop member 18 attachment.

In this embodiment (e.g., FIG. 4), an inventive strike indicator 28 is shown attached to the line 2 at a point where it is engaged with a stop member 18, which has been attached to line 2 at a user-selected position. In particular embodiments, the distance between the stop member 18 ends is less than one-half the distance between the main body ends 8. In additional preferred embodiments, the disengagable strike indicator system comprises two line stop members 18 receivable at opposite ends of the main body 16. Therefore, additional embodiments provide a disengageable strike indicator system (having at least one stop member 18), further comprising a fishing line 2 extending through the main body channel 10 and reversibly attached to the main body at two points along the line 2 by means of the exterior retention member seat (e.g., groove 6) and retention member 4, wherein the strike indicator is disengagable from the line 2 upon application of sufficient tension to the line 2, and is thereafter slidable from or to the attachment position of the at least one line stop member 18. Therefore, in particular embodiments, the strike indicator 28, comprises a fishing line 2 extending through the main body channel 10 and, after emerging at the two opposing main body channel end openings 8, passing therefrom in opposing directions under the retention member 4 within the external seat (e.g., groove 6), wherein the strike indicator is thereby reversibly attached at two points along the line 2, disengagable from the line 2 upon application of sufficient tension to the line 2, and is thereafter slidable to or from the user-selected attachment position of the at least one line stop member 18.

Figure 3A:
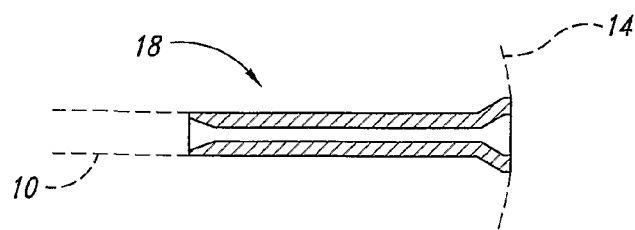
FIGS. 3A-3C show, according to particular aspects, side views of three exemplary line stop member embodiments that are attachable to a fishing line at user-selectable positions. The inventive line stop members are receivable into the axial channel of the main body of the inventive disengagable strike indicators to provide for a disengagable strike indicator system, and wherein the shape and/or dimension of the line stop members is operative to engage the line stop member within the main body channel of the inventive strike indicators to limit slidable travel of the disengaged strike indicator along a fishing line. The line stop members, when engaged by the indictor main body, may be flush, recessed, or protruding from the main body surface.
Figure 3B:
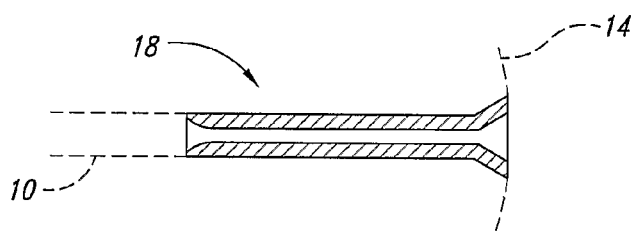
Figure 3C:
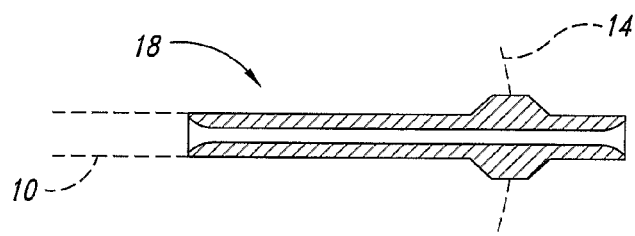

FIGS. 3A, 3B and 3C show side views of three exemplary line stop members 18 attachable to a fishing line 2 at a user-selectable position. The inventive line stop member(s) 18 are receivable into the axial channel 10 of the main body of the inventive disengagable strike indicators (partially shown as dashed lines 14 in the figure) to provide for a disengagable strike indicator system, and the shape and/or dimension of the line stop members 18 is operative to engage the line stop member 18 within the main body channel 10 of the inventive strike indicators to limit slidable travel of the disengaged strike indicator along a fishing line 2. The engagement aspect of the stop member may, for example, correspond to an enlarged portion thereof (e.g., flange, bulge, etc.) that engages a conforming stop member receiving surface of the axial channel 10 (see FIGS. 3A-3C). The line stop members can be of any material that is fixable to the line 2 (e.g., a ductile material that can be pressed, clamped or crimped to be retainable at a fixed point on a line 2 and/or leader or tippet, an elastic member that attaches by means of its inherent dimensional character and elasticity, etc.). Affixing the line stop member to the line may be by any suitable means including but non limited to, crimping of a stop member comprising a ductile material (e.g., metal, plastic, etc.), clamping of a clampable stop member, adhering of a stop member to the line, affixing by inherent elastic means, etc., as long as the stop member is attached to the line in a fixed or effectively fixed, non-slidable (or at least substantially non-slidable) manner, so that the attached stop members serves to effectively preclude slidable travel of the disengaged strike indicator beyond the stop member attachment position. Stop members, may comprise, e.g., on the inner surface thereof, material or structures that preclude or minimize line wear, or materials or structures that facilitate gripping of the line. Encompassed within the scope of the present invention are those stop members that are attached to a line in a manner sufficient, in practical terms depending on the type and nature of the operational fishing, to substantially preclude slidable movement, but nonetheless are positionable along the line with sufficient applied force if repositioning is desired (e.g., tight fitting elastic members for example). Preferably, the stop members are of a ductile metal, and have a non-gripping exterior surface so as not to preclude travel through line guides.

FIG. 4 shows a side view of an exemplary disengagable strike indicator system embodiment having a line stop member 18 engaged therein, so that in operation the strike indicator is engaged at a user-selected position along the line and/or leader or tippet.

FIGS. 5A and 5B show a side view of an exemplary disengagable strike indicator system embodiment having a line stop member 18 engaged therein, and further shows (in going from FIG. 5A to 5B) how the annular line retention member 4 is displaceable from the retention member seat (e.g., exterior groove 6) of the main body 16 upon application of sufficient line tension, which in turn disengages the strike indicator, thereafter allowing sliding of the disengaged strike indicator along the line 2. Typically, in such embodiments, the retention member is displaced on the larger aspect side of the main body (e.g., ovoid), but alternatively, displacement can be on the opposing side of the strike indicator. According to particular aspects, the shape of the indicator main body 16 and the disposition of the retention member seat (e.g., 6 or 7) thereto, can be selected to facilitate displacement of the line retention member to one side or another of the indicator main body upon disengagement (see e.g., FIGS. 1, 4, 5B, 10A, 11A and 6B). In either case, the line retention member 4 is retained around the line 2, and thus operationally retrievable for reuse in the novel disengaging strike indicator system.

Significantly, therefore, the novel, nature, design and methods using the present strike indicators and systems allow for adjustable, consistent (e.g., repeatedly disengagable at the same, or substantially the same line tension value), controlled and reproducible disengagement and reuse in the absence of significant wear, degradation, deformation, etc., of the attachment surfaces and of the line surfaces. Moreover, the inventive strike indicators and systems may be selected to disengage at variety of line tension values, depending upon the conformation, dimension and properties (e.g., size, elastic strength (i.e., tensile elastic modulus), etc.) of the line retention members 4, conformation and dimension of the line retention member seats, and the relational disposition of these aspects with respect to each other and with respect to other aspects of the strike indicator (e.g., relative orientation to axial channel 10; orientation with respect to particular conformational aspects (e.g., asymmetric shape aspects; see, e.g., FIG. 6B) of the main body 16, etc.).

In particular embodiments, the disengagable strike indicator system comprises a first and a second line stop member 18, and further comprises a fishing line 2 (or leader and/or tippet) extending through the main body channel 10 and through a channel of the first stop member 18 engaged therein, the line 2 being reversibly attached to the main body 16 at two points along the line 2 by means of the line retention member seat (e.g., exterior groove 6, raised ridge 7, etc.) and retention member 4, wherein the strike indicator is disengagable from the line 2 upon application of sufficient tension to the line 2 (e.g., tensional stress along the line crossing the two attachment positions) and is thereafter slidable (e.g., from a position of engagement with the first stop member, to the engagement and attachment position of the second line stop member 18 that is positioned along the line a user selectable distance from the position of the first attached strike indicator, and on the side of the strike indicator that is opposite that of the first engaged line stop member 18). Therefore, in particular embodiments, the strike indicator 28, comprises a first and a second line stop member 18, further comprises a fishing line 2 extending through the main body channel 10 and through a channel of the first line stop member 18 engaged therein, and the line 2, after emerging at the two opposing main body channel end openings 8, passing therefrom in opposing directions under the retention member 4 seated on the retention member seat (e.g., the external groove 6, raised ridge 7, etc.), wherein the strike indicator is thereby reversibly attached (e.g., restrained) at two points along the line 2, disengagable from the line 2 upon application of sufficient tension to the line 2 (across the two line restraining positions) and is thereafter slidable to the attachment position of the second line stop member 18 positioned along the line 2 a distance from the attached strike indicator, and on the side of the strike indicator that is opposite that of the first engaged line stop member.

The inventive novel system comprises at least one stop member 18, and is not necessarily limited to any particular disengagable strike indicator design, provided that it is freely slidable on the line 2 once disengaged therefrom. Therefore, general aspects provide a disengagable strike indicator system for a fishing line, comprising: a fishing line 2; a buoyant disegagable strike indicator that is reversibly attachable to, disengagable from and thereafter slidable along a fishing line 2; and at least one strike indicator stop member 18 attachable to a user-selectable position along the fishing line 2, and sufficient, in operation, to limit slidable travel of the disengaged strike indicator along the fishing line 2. Particular general aspects comprise first and second attachable strike indicator stop members 18 attached at different user-selected positions along the fishing line 2, and suitable, in operation of the system, to delimit a slidable range of the disengaged slidable strike indicator along the fishing line. In particular general aspects, the disengagable strike indicator is attached to the line 2 in engagement with the first line stop member attached at a first user-selected line position, and, upon disengagement, the disengaged strike indicator is thereafter slidable along the fishing line 2 between the first and second line stop members 18. In preferred aspects, the strike indicator is disengagable my means of application of sufficient tension to the fishing line (e.g., upon a fish 'hook-up'). Therefore, general aspects of the present invention provide a method of fishing using a disengagable strike indicator system in combination with at least one strike indicator stop member 18.

With reference to FIGS. 4, 5A, 5B and 7, specific embodiments provide a method of fishing (e.g., essentially any type of fishing in any type of water) with a strike indicator at a set depth X (e.g., corresponding to a 'holding zone' or 'concentration feeding zone' 22) greater than the length Y of a fishing rod, comprising: obtaining a fishing line 2 in operable communication with a fishing rod 32, the line 2 extending through rod line guides and from a tip portion of the fishing rod to a fishing hook 20 and retrievable with line retrieving means mounted on the fishing rod 32, the extended line portion having hook-proximal and hook-distal positions. The method further comprises attaching, to the extended line portion, a first and a second strike indicator stop member 18 at a first, hook-distal line stop position corresponding to a desired fishing depth X, and a second, hook-proximal line stop position corresponding to a position of length Y from the hook, and equal to about the length Y of the fishing rod, respectively, wherein the line stop members 18 are receivable into a buoyant disengagable strike indicator 28, and wherein the shape and/or dimensional aspect of the line stop members 18 is operative to engage the line stop member 18 within the buoyant disengagable strike indicator 28. The method additionally comprises attaching, between the two line stop members 18, to the line 2 and in engagement with the first hook-distal stop member 18, a buoyant disegagable fishing line strike indicator 28 reversibly attached to, disengagable from and thereafter slidable along the fishing line 2 between first and second stop members 18, the strike indicator 28 disengagable by application of sufficient line tension. The method further comprises: disengaging the strike indicator 28 by setting the hook into a fish (e.g., a fish 'hook-up'); and retrieving the extended line to a line position corresponding to about that of the second stop member 18, wherein fishing at a depth X greater than the length Y of a fishing rod and yet reaching the hooked fish for effective and efficient retrieval is afforded.

Novel Reversibly Disengagable Line-Stop Members and Systems and Methods Comprising Same:

Additional aspects provide novel line-stop member devices and methods for adjustably and reversibly engaging a line (including, but not limited to fishing lines, ropes, string, cable, wire, cords, etc.) at an engagement position and/or for demarcating one or more positions and/or spans along a line. The inventive line-stop members are reversibly disengagable (or reversibly engagable), and thereby slidably adjustable and positionable along a line, and two such line-stop members can be used to define a user-selectable range or span therebetween.

Further aspects provide novel disengagable strike indicator systems that comprise, in addition to a strike-disengagable or non-strike-disengagable strike indicator, at least one 'reversibly disengagable strike indicator line-stop member' (e.g., as described herein below) that is attachable at a user-selected fixed position along a fishing line, and is engagable with the inventive strike indicator main bodies to limit slidable travel of a disengaged strike indicator along the fishing line, or is additionally or alternatively fixedly engageable with an internal engagement collar of particular inventive strike indicator embodiments to provide for a non-strike-disengagable strike indicator (e.g., an effectively fixed strike indicator).

In preferred embodiments, particular 'dual-use' inventive strike indictor bodies (having an internal engagement collar) can be used for dual purposes as a strike-disengagable (using a line-retention member in the line-retention member seat of the strike indicator main body, and not fixedly engaging the internal enagagement collar with the inventive reversibly enagagable line-stop member), or non-strike-disengagable (not using a line-retention member, and rather fixedly engaging the internal enagagement collar with the inventive reversibly enagagable line-stop member) strike indicator.

Further aspects provide novel methods for fishing, comprising fishing with an inventive strike-disengagable or non-strike-disengagable strike indicator with the inventive reversibly disengagable strike indicator line-stop member(s) (e.g., as described herein below), or the inventive strike indicator system.

FIGS. 16A-E, show, according to one exemplary embodiment of the present invention, a novel slide-collar clamping line-stop member. The line-stop member comprises an elongated line-clamping member 60, and an cylindrical engagement collar 72 having collar channel therethrough and slidably positionable along the line-clamping member 60, and suitable and positionable to reversibly hold the line-clamping member 60 in a line-clamping position to engage a line, and suitable and positionable to reversibly disengage the line-clamping member 60 from the line-clamping position to reversibly disengage a line. The line-clamping member 60 comprises a longitudinal axial bore 80 or channel suitable to allow slidable passage of a line therethrough. The line-clamping member 60 additionally comprises, at one end, at least one pair of line-clamping arms 68 or members each having a collar-stop flange 66 at one end thereof, the line-clamping arms or members operative with the engagement collar 72, and operatively associated and positionable with respect to each other (e.g., by means of at least one hinge or pivot element 64, etc) to allow for clamping a line therebetween to engage a line. The line-clamping member 60 additionally comprises, at the other end, a collar-mounting and retention portion 62, comprising a plurality of spaced, (e.g., resilient) collar-mounting and retention arms 74, each having a retention arm collar-stop flange 76. In particular embodiments, the plurality of collar-mounting and retention arms are spaced or separated by at least one slot 78, the slot suitable to allow for reversibly decreasing (e.g., by compressing the arms toward each other) the distance between the collar-mounting and retention arms to allow for initial mounting and retention (by virtue of the retention arm collar-stop flanges) of the engagement collar 72 on the line-clamping member 60. Situated between the pair of line-clamping arms 68 and the collar-mounting and retention portion 62 is an engagement collar positioning portion 20. The engagement collar positioning portion 20 comprises means to position the engagement collar 72 on the line-clamping member 60. In one aspect, the engagement collar positioning portion 20 allows for engaging a line by positioning the engagement collar 72 on the line-clamping member 60 in a position (e.g., a line-engagement position) that affords operative association with the line-clamping arms 68 or members to allow for clamping a line therebetween. In another aspect, the engagement collar positioning portion 20 allows for disengaging a line by positioning the engagement collar 72 on the line-clamping member 60 in a position (e.g., a line-disengagement position) that precludes operative association with the line-clamping arms 68. In the exemplary embodiment shown, the engagement collar positioning portion 20 comprises a resilient compressible bulge having, in the uncompressed state, an outside diameter larger than the engagement collar channel diameter such that the engagement collar positioning portion 20 must be compressed (e.g., by applying sufficient lateral force with the engagement collar) to reposition the collar between the line-engagement position and the line disengagement position.

FIGS. 17A-D, show, according to another exemplary embodiment of the present invention, a screw-collar clamping line-stop member. The line-stop member comprises an elongated line-clamping member 70, and an cylindrical engagement collar 72 having a collar channel therethrough and positionable along the line-clamping member 70, and suitable and positionable to reversibly hold the line-clamping member 70 in a line-clamping position to engage a line, and suitable and positionable to reversibly disengage the line-clamping member 70 from the line-clamping position to reversibly disengage a line. The line-clamping member 70 comprises a longitudinal axial bore 78 or channel suitable to allow slidable passage of a line therethrough. The line-clamping member 70 additionally comprises, at one end, at least one pair of line-clamping arms 68 or members each having a collar-stop flange 66 at one end thereof, the line-clamping arms or members operative with the engagement collar 72, and operatively associated and positionable with respect to each other (e.g., by means of at least one hinge or pivot element 64, etc) to allow for clamping a line therebetween to engage a line. The line-clamping member 70 additionally comprises, at the other end, a collar-mounting and retention portion 62, comprising a plurality of spaced, (e.g., resilient) collar-mounting and retention arms 74, each having a retention arm collar-stop flange 76. In particular embodiments, the plurality of collar-mounting and retention arms are spaced or separated by at least one slot 78, the slot suitable to allow for reversibly decreasing (e.g., by compressing the arms toward each other) the distance between the collar-mounting and retention arms to allow for initial mounting and retention (by virtue of the retention arm collar-stop flanges) of the engagement collar 72 on the line-clamping member 70. Situated between the pair of line-clamping arms 68 and the collar-mounting and retention portion 62 is an engagement collar positioning portion 20. The engagement collar positioning portion 20 comprises means to position the engagement collar 72 on the line-clamping member 70. In one aspect, the engagement collar positioning portion 20 allows for engaging a line by positioning the engagement collar 72 on the line-clamping member 70 in a position (e.g., a line-engagement position) that affords operative association with the line-clamping arms 68 or members to allow for clamping a line therebetween. In another aspect, the engagement collar positioning portion 20 allows for disengaging a line by positioning the engagement collar 72 on the line-clamping member 70 in a position (e.g., a line-disengagement position) that precludes operative association with the line-clamping arms 68. In the exemplary embodiment shown, the engagement collar positioning portion 20 comprises thread means complementary to thread means located within the engagement collar channel such that the engagement collar positioning portion 20 must be engaged by screwing the engagement collar thereon between the line-engagement position and the line disengagement position According to preferred aspects of the present invention, the inventive line-stop members can be used as part of a system, in combination with strike-disengagable (as described herein in detail) or non-strike-disengagable strike indicators as described herein below in detail. Moreover, while the above-described inventive reversibly disengagable line-stop members can be designed in essentially any size to accommodate a variety of line types and diameters, in preferred aspects, the inventive line-stop members are designed to be dimensionally compatible for engagement within the axial bores (axial channels) of the strike-disengagable and non-strike-disengagable strike indicators described in detail herein.

Novel Reversibly Disengagable Line-stop Members and Non-Strike-Disengagble Systems and Methods Comprising Same:

Additional preferred embodiments provide novel slidably adjustable non-strike-disengagable strike indicators, comprising a reversibly disengagable line-stop member embodiment as described above in combination with a buoyant strike indicator main body portion having an 'internal engagement member' 24 (e.g., collar, flange, band, ring, notch, etc.) within the main body channel 10 (see, e.g., FIGS. 18A-C and 19A-C). In certain of such preferred aspects, the retention arm collar-stop flange(s) 76 of the collar-mounting and retention portion 62 optionally engage an internal engagement member 24 (e.g., collar, flange, band, ring, notch, etc.) within the main body channel 10 of particular 'dual-use' strike indicator main body embodiments.

Such 'dual-use' inventive strike indictor bodies (having an internal engagement collar) are usable for dual purposes as a strike-disengagable (using a line-retention member 4 in the line-retention member seat 6 of the strike indicator main body, and not fixedly engaging the internal engagement member 24 (e.g., collar) with the inventive reversibly engagable line-stop member), or non-strike-disengagable (not using a line-retention member, and rather fixedly engaging the internal enagagement member 24 (e.g., collar) within the channel 10 of the inventive reversibly enagagable line-stop member) strike indicator. Alternatively, the inventive reversibly disengagable line-stop members may be used with strike indicator embodiments that do not have a retention member or retention member seat as used herein, provided that such main bodies comprise an internal engagement member (e.g., collar) engagable by the inventive reversibly engagable (reversibly disengagable) line-stop members.

Figure 18A:
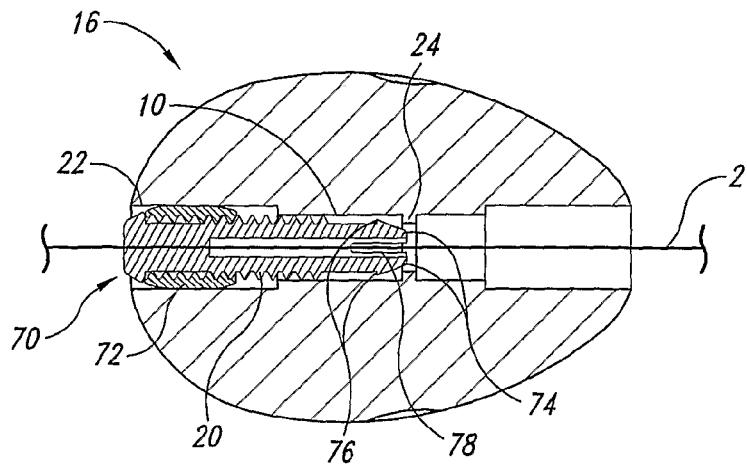
FIGS. 18A-C show, according to yet another exemplary embodiment of the present invention, a screw-collar clamping line-stop member in combination with a strike indicator having an internal engagement collar 24 within the axial channel 10.
Figure 18B:
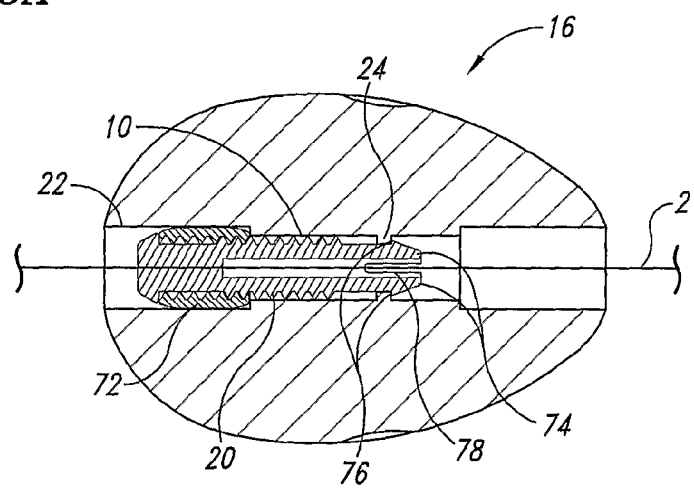
Figure 18C:
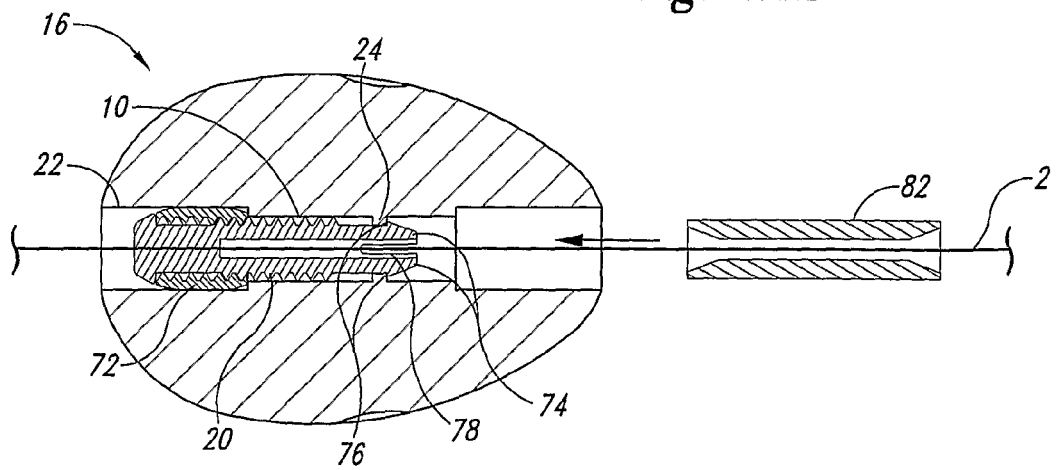

FIGS. 18A-C show, for example, a screw-collar clamping line-stop member (e.g., such as that of FIGS. 17A-D) in combination with a dual-use strike indicator main body portion having an internal engagement collar 24 within the axial channel 10. The line-stop member comprises an elongated line-clamping member 70 having line-clamping arms 68 or members at one end, and a cylindrical engagement collar 72 having a collar channel therethrough and positionable along the line-clamping member 70 and suitable and positionable to reversibly hold the line-clamping member 70 in a line-clamping position to engage a line. The line-clamping member 70 additionally comprises, e.g., at the other end, a collar-mounting and retention portion 62, comprising a plurality of spaced, (e.g., resilient) collar-mounting and retention arms 74, each having a retention arm collar-stop flange 76. FIGS. 18A and 18B show the combination before and after, respectively, engagement of the screw-collar clamping line-stop member (e.g., engagement of the retention arm collar-stop flanges 76 thereof) with the internal engagement collar 24. FIG. 18C shows, according to further aspects, an exemplary tool 82 for disengaging the screw-collar clamping line-stop member (e.g., for disengagement of the retention arm collar-stop flanges 76 thereof) from the internal engagement collar 24. In this exemplary embodiment, the internal engagement collar 24 and the counterbores 22 are somewhat asymmetrically configured within the strike indicator main body.

Figure 19A:
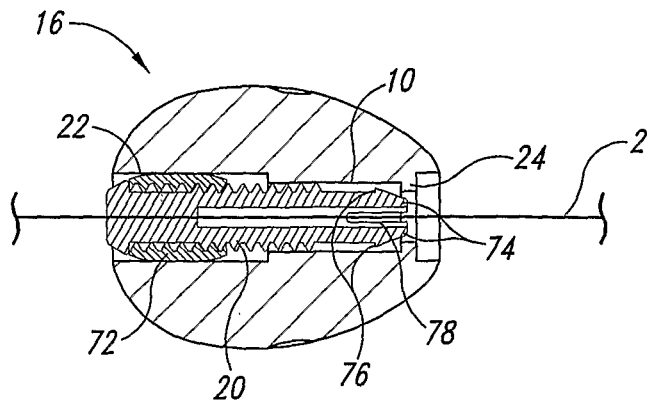
FIGS. 19A-C show, according to additional embodiments, a screw-collar clamping line-stop member in combination with a strike indicator having an internal engagement collar 24 within the axial channel 10.
Figure 19B:
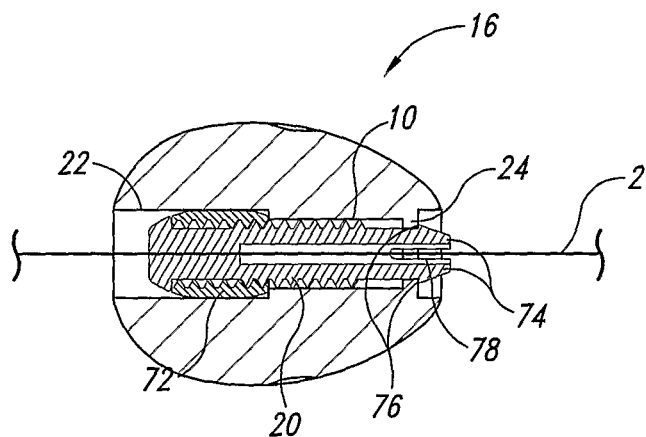
Figure 19C:
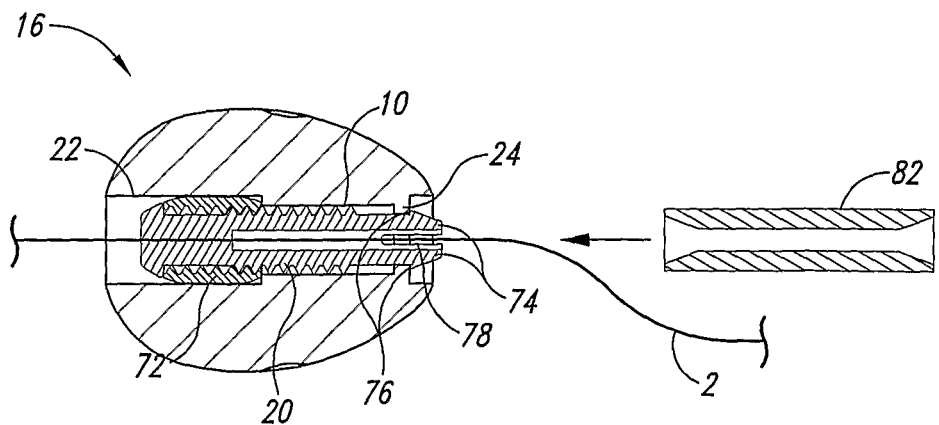

FIGS. 19A-C show, according to additional embodiments, the screw-collar clamping line-stop member of FIGS. 18A-C, in combination with a strike indicator having an internal engagement collar 24 within the axial channel 10. FIGS. 19A and 19B show the combination before and after, respectively, engagement of the screw-collar clamping line-stop member with the internal engagement collar 24 (e.g., before and after engagement of the retention arm collar-stop flanges 76 thereof). FIG. 19C shows, according to further aspects, an exemplary tool 82 for disengaging the screw-collar clamping line-stop member from the internal engagement collar 24. In this exemplary embodiment, the internal engagement collar 24 and the counterbores 22 are significantly asymmetrically configured within the strike indicator main body.

The disengagement tool 82 can be of any design suitable to displace or compress the retention arms 74 and retention arm collar-stop flanges 76 such that they can be removed (disengaged) from the internal engagement collar 24. The exemplary tool shown comprises a funnel shape having an angle and size suitable to compress the retention arms 74 and retention arm collar-stop flanges 76 upon application of the tool to the arms within the channel 10 using sufficient pressure. The tool, for example could be of a variety of shapes (e.g., funnel, cylinder, square, ovoid, rectangular, sizes and/or designs (e.g., compressive shape (e.g., funnel, cylinder, etc.), pliar-type arms, etc., and may be either single-ended or double-ended (as shown herein) or may have more ends. The tool may have the same or different tool sizes or designs on each end thereof. All that is required is that the tool, or some portion thereof can be applied to the retention arms 74 and/or retention arm collar-stop flanges 76 to facilitate disengagement from the internal engagement collar 24.

As will be apparent to one of skill in the relevant art, line stop members (e.g., any of those shown herein) can be of any size (e.g., any size that is receivable into a strike indicator main body portion). Preferably, the inventive line-stop members are large enough to facilitate easy handling, engagement, disengagement, adjustment, etc., by a user. Additionally, as will be apparent to one of skill in the relevant art, only one line-stop member (e.g., only one reversibly disengaging line-stop member, or any described herein) is required, according to aspects of the instant invention, to affix a strike indicator main body to a line. This is true regardless of the particular strike indicator main body used, and in the case of 'dual-use' indicator main body portions, regardless of whether the strike indicator main body is being used as a strike-disengagable strike indicator (i.e., using a line-retention member 4 in the line-retention member seat 6 of the strike indicator main body, and not fixedly engaging the internal engagement member 24 (e.g., collar) with the inventive reversibly engagable line-stop member), or as a non-strike-disengagable strike indicator (i.e., not using a line-retention member 4, and rather fixedly engaging the internal enagement member 24 (e.g., collar) within the channel 10 of the inventive reversibly enagagable line-stop member). Therefore, there is no requirement that the attributes of the main body channel 10, such as the depth (or even presence) of an opposing (opposite that of the countersink bore used for receiving the initially positioning line-stop member) countersink bore 22, and/or the positioning of the internal engagement member (e.g., collar) within the channel 10 must be symmetrical. That is, the counter bores, if present in a plurality, may be of different diameters, and/or depths, or there may be only a single counterbore 22 at one end of the channel 10. Additionally, the position of the internal engagement member 24 (e.g., collar, flange, band, ring, notch, etc.) may be other than a central position of the channel 10; that is, the internal engagement member may be disposed closer to, at or near one or the other end of the channel 10, for example. Preferably, in small main body portion embodiments (such as that shown in FIGS. 19A-C), the internal engagement member 24 is disposed at or near the end of the channel 10 that is opposite the end receiving the line-stop member. In this way, the size of the line stop-member can be kept sufficiently large to facilitate easy handling by a user, while at the same time enabling use of very small strike indicator main bodies. Thus, while preferred embodiments of the inventive strike indicator main bodies have a channel 10 and at least one counterbore 22 at one end, there is no requirement for an opposing counterbore, and even if such an opposing counterbore is present, there is no requirement that the diameter and/or depth of such opposing counterbore is the same as that of the opposed counterbore. In certain 'system' embodiments described herein comprising two stop members (e.g., a rod-proximal line-stop member, and a hook-proximal line-stop member), where a main body is slidable therebetween, all that is really required is that the line-stope members (e.g., the hook-proximal line-stop member) be able to engage, and/or limit slidable travel of the main body portion with respect to the line attachment position of the line-stop member.

The invention claimed is:

1. A disengagable fixed position strike indicator system for a fishing line, comprising:
   a buoyant main body portion having an exterior surface, first and second main body ends, and an axial channel therebetween having an internal engagement collar, the channel with corresponding first and second main body end surface openings, the channel sufficient, in operation, to allow slidable passage of a fishing line therethrough without permitting the line to separate from the main body; and
   at least one strike indicator stop member having at least one engagement flange, the stop member fixedly attachable to the fishing line to be non-slidable on the fishing line when the buoyant main body portion, in operation, is disengaged and separated from the fixedly attached stop member to a user-selectable position along a portion of a fishing line, leader or tippet portion thereof, the stop member configured to reversibly but fixedly engage the at least one engagement flange with the internal engagement collar to provide for a disengagable fixed position strike indicator system, wherein, in operation, the main body portion is disengagable from the fixedly attached stop member to slide along the fishing line, leader or tippet portion thereof.

2. The strike indicator system of claim 1, comprising a second fixedly attachable strike indicator stop member for attachment at different user-selectable positions along the fishing line, leader or tippet portion, and suitable, in operation of the system, to delimit a slidable range of the main body portion along the fishing line, or a leader or tippet portion thereof, and wherein the second fixedly attachable stop member is non-slideable on the fishing line when the buoyant main body portion, in operation, is disengaged and separated from the fixedly attached stop member to a user-selectable position along a portion of a fishing line.

3. The strike indicator system of claim 2, wherein, in operation, the main body portion is attachable to the line, leader or tippet portion in engagement with the first line stop member attached at a first line position, and wherein, upon disengagement, the disengaged main body portion is thereafter slidable along the fishing line, or a leader or tippet portion thereof, between the first and second line stop members.

4. The strike indicator system of claim 1, further comprising a disengagement tool for disengaging the at least one engagement flange from the internal engagement collar.

5. The strike indicator system of claim 1, wherein the at least one engagement flange is radially compressible, and expandable against the internal engagement collar to provide for reversible but fixed engagement of the at least one collar stop flange with the internal engagement collar.

6. The strike indicator system of claim 1, further comprising one or more of the line, and the leader and tippet thereof.

7. A reversibly disengagable line-stop member, comprising:

an elongated line-clamping member having, at a line-clamping end, a plurality of line-clamping arms each with a line-gripping surface, at least one of said line-clamping arms having a line-clamping arm collar-stop flange, the elongated line-clamping member having, at an opposing collar mounting and retention end, a collar-mounting and retention portion comprising a plurality of spaced, collar-mounting and retention arms, each retention arm having a retention arm collar-stop flange, the elongated line clamping member having a longitudinal axial bore or channel suitable to allow slidable passage of a line therethrough;

a cylindrical engagement collar having a collar channel therethrough and positionable along the line-clamping member, the engagement collar positionable in a line-engagement position to operatively and reversibly hold the plurality of line-clamping arms in a line-clamping or line-engagement position sufficient for fixedly engaging a line between a respective plurality of the line gripping surfaces, and additionally positionable in a line-disengagement position to operatively and reversibly disengage the line from the respective plurality of line gripping surfaces; and an engagement collar positioning portion disposed between the line-clamping arm collar stop flange and the retention portion collar-stop flanges, the engagement collar positioning portion comprising means to reversibly position and retain the engagement collar on the line-clamping member in the line-engagement position, or in the line-disengagement position, wherein the retention portion collar-stop flange is configured to delimit positioning of the engagement collar to preclude separation thereof from the elongated line-clamping member when the engagement collar is in the line-disengagement position, and wherein the line-clamping member is fixedly repositionable along a line.

8. The reversibly disengagable line-stop member of claim 7, wherein the engagement collar positioning portion comprises a compressible portion having, in the uncompressed state, an outside diameter larger than the engagement collar channel diameter such that the engagement collar positioning portion must be compressed to reposition the collar between the line-engagement position and the line disengagement position.

9. The reversibly disengagable line-stop member of claim 7, wherein the engagement collar positioning portion comprises thread means complementary to thread means located within the engagement collar channel such that the engagement collar positioning portion must be engaged by screwing the engagement collar thereon between the line-engagement position and the line disengagement position.

\* \* \* \* \*